US012393627B2

(12) United States Patent
Bonfield et al.

(10) Patent No.: US 12,393,627 B2
(45) Date of Patent: *Aug. 19, 2025

(54) SYSTEMS AND METHODS FOR LEVERAGING ACOUSTIC INFORMATION OF VOICE QUERIES

(71) Applicant: Adeia Guides Inc., San Jose, CA (US)

(72) Inventors: Charles Bonfield, Raleigh, NC (US); Manik Malhotra, Durham, NC (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,279

(22) Filed: Jun. 20, 2024

(65) Prior Publication Data

US 2024/0338403 A1 Oct. 10, 2024

Related U.S. Application Data

(63) Continuation of application No. 18/131,100, filed on Apr. 5, 2023, now Pat. No. 12,045,274, which is a continuation of application No. 17/255,320, filed as application No. PCT/US2020/020206 on Feb. 27, 2020, now Pat. No. 11,651,020.

(Continued)

(51) Int. Cl.
*G06F 16/432* (2019.01)
*G06F 16/2457* (2019.01)
*G06F 16/435* (2019.01)
*G06F 16/438* (2019.01)
*G06F 16/9535* (2019.01)

(52) U.S. Cl.
CPC ...... *G06F 16/433* (2019.01); *G06F 16/24578* (2019.01); *G06F 16/435* (2019.01); *G06F 16/438* (2019.01); *G06F 16/9535* (2019.01)

(58) Field of Classification Search
None
See application file for complete search history.

(56) References Cited

U.S. PATENT DOCUMENTS 8,630,860 B1 1/2014 Zhang et al.
9,116,918 B1 8/2015 Kim
(Continued)

OTHER PUBLICATIONS

Intent Classification of Voice Queries on Mobile Devices (Year: 2013).*

*Primary Examiner* — Kim T Nguyen
(74) *Attorney, Agent, or Firm* — Haley Guiliano LLP

(57) ABSTRACT

The methods and systems described herein leveraging acoustic features of a user to generate and present a personalized content to a user. In one example, the method receives a voice query and determines that the query refers to either a first content item or a second content item. The first content item is associated with a first type assigned with a first score and the second content item is associated with a second entity type assigned with a second score. The method also determines whether the query is from the second entity type. The method ranks the first and the second content items based on this determination and generates for presentation of the first and the second content items based on the ranking. The method also changes the first or the second scores based on this determination and selects one of the first or the second content item for presentation.

20 Claims, 17 Drawing Sheets

Related U.S. Application Data

(60) Provisional application No. 62/843,785, filed on May 6, 2019.

(56) References Cited

U.S. PATENT DOCUMENTS

| | | | |
|---|---|---|---|
| 9,477,759 | B2 | 10/2016 | Keysar et al. |
| 9,646,050 | B1 | 5/2017 | Kim |
| 9,875,740 | B1 | 1/2018 | Kumar et al. |
| 10,176,810 | B2 | 1/2019 | Kumar et al. |
| 10,235,999 | B1 | 3/2019 | Naughton et al. |
| 10,339,190 | B2 | 7/2019 | Keysar et al. |
| 10,430,449 | B2 | 10/2019 | Sreedhara |
| 10,585,942 | B2 | 3/2020 | Ramer et al. |
| 10,747,817 | B2 | 8/2020 | Sreedhara |
| 10,769,210 | B2 | 9/2020 | Sreedhara |
| 10,922,322 | B2 * | 2/2021 | Kleindienst ............ G06N 20/00 |
| 10,942,039 | B2 | 3/2021 | Min et al. |
| 11,048,387 | B1 | 6/2021 | Srinivasan et al. |
| 11,128,910 | B1 | 9/2021 | Aher et al. |
| 11,133,005 | B2 | 9/2021 | Aher et al. |
| 11,481,401 | B2 | 10/2022 | Baughman et al. |
| 11,609,944 | B2 * | 3/2023 | Bonfield ............... G06F 16/433 |
| 12,045,274 | B2 * | 7/2024 | Bonfield ........... G06F 16/24578 |
| 2017/0147585 | A1 * | 5/2017 | Kleindienst ............ G06N 20/00 |
| 2017/0242857 | A1 | 8/2017 | Kim |
| 2018/0018959 | A1 | 1/2018 | Des Jardins et al. |
| 2018/0025010 | A1 | 1/2018 | Ramer et al. |
| 2018/0114531 | A1 | 4/2018 | Kumar et al. |
| 2019/0102481 | A1 | 4/2019 | Sreedhara |
| 2019/0318721 | A1 | 10/2019 | Tadpatrikar et al. |
| 2020/0041300 | A1 | 2/2020 | Min et al. |
| 2020/0204848 | A1 | 6/2020 | Johnson et al. |
| 2020/0301657 | A1 | 9/2020 | Edmonds et al. |
| 2020/0312318 | A1 | 10/2020 | Olson et al. |
| 2020/0342859 | A1 | 10/2020 | Aher et al. |
| 2021/0326399 | A1 | 10/2021 | Hayes |
| 2022/0050865 | A1 * | 2/2022 | Bonfield ............... G06F 16/433 |
| 2022/0050866 | A1 * | 2/2022 | Bonfield ............... G06F 16/435 |
| 2022/0058232 | A1 | 2/2022 | Keysar et al. |
| 2022/0164360 | A1 | 5/2022 | Baughman et al. |
| 2023/0244709 | A1 * | 8/2023 | Bonfield ............... G06F 16/433 |
| | | | 707/734 |
| 2024/0068831 | A1 | 2/2024 | Min et al. |
| 2024/0338403 | A1 * | 10/2024 | Bonfield ............ G06F 16/9535 |
| 2025/0110682 | A1 * | 4/2025 | Chen ................... G06F 3/1454 |
| 2025/0111328 | A1 * | 4/2025 | Xu .................. G06Q 10/08355 |
| 2025/0111616 | A1 * | 4/2025 | Wannerberg .......... G06T 19/006 |
| 2025/0111617 | A1 * | 4/2025 | Wannerberg .......... G06T 19/006 |
| 2025/0111664 | A1 * | 4/2025 | Couleaud ............. G06V 20/70 |

* cited by examiner

300

| | Content Item Identifier | Type of Entity | Revelance Score | |
|---|---|---|---|---|
| 302a | Frozen Action Movie 2010 | Adult 304a | 800 | 306a |
| 302b | Fifty Shades of Grey Movie | Adult 304b | 990 | 306b |
| 302c | White Boy Rick TV Series | Adult 304c | 700 | 306c |
| 302d | The Frozen Movie 2012 | Unknown 304d | 1300 | 306d |
| 302e | Blind Side Movie | Unknown 304e | 1535 | 306e |
| 302f | A League of Their Own TV Series | Unknown 304f | 1389 | 306f |
| 302g | Frozen Cartoon Movie 2019 | Child 304g | 200 | 306g |
| 302h | Teletubbies Movie | Child 304h | 100 | 306h |
| 302i | Shrek 2 Movie | Child 304i | 300 | 306i |

| Content Item Identifier | Type of Entity | Revelance Score |
|---|---|---|
| Frozen Action Movie 2010 | Adult 304a | 350 |
| Fifty Shades of Grey Movie | Adult 304b | 990 |
| White Boy Rick TV Series | Adult 304c | 700 |
| The Frozen Movie 2012 | Unknown 304d | 1300 |
| Blind Side Movie | Unknown 304e | 1535 |
| A League of Their Own TV Series | Unknown 304f | 1389 |
| Frozen Cartoon Movie 2019 | Child 304g | 230 |
| Teletubbies Movie | Child 304h | 100 |
| Shrek 2 Movie | Child 304i | 300 |

| Content Item Identifier | Type of Entity | Revelance Score |
|---|---|---|
| Frozen Action Movie 2010 | Adult 304a | 870 |
| Fifty Shades of Grey Movie | Adult 304b | 990 |
| White Boy Rick TV Series | Adult 304c | 700 |
| The Frozen Movie 2012 | Unknown 304d | 1300 |
| Blind Side Movie | Unknown 304e | 1535 |
| A League of Their Own TV Series | Unknown 304f | 1389 |
| Frozen Cartoon Movie 2019 | Child 304g | 160 |
| Teletubbies Movie | Child 304h | 100 |
| Shrek 2 Movie | Child 304i | 300 |

| Feature Class | Feature Class Examples |
|---|---|
| Mel-frequency Cepstral Coefficients (MFCCs) | MFCCs, Deltas, Double Deltas (Mean, stddev) |
| Harmonics | Hand-crafted (Total Harmonic Distortion) |
| Pitch | Fundamental Frequency (f0), Jitter |
| Intensity | Intensity/Loudness, Shimmer |
| Speech Rate | Voiced-to-Unvoiced Ratio, Estimated Number of Syllables/Pauses |
| Datetime | Time of Day, Day of Week, Weekday/Weekend |

FIG. 5

```
702 ─┐
        ┌─────────────────────────────────────────────┐
702a ───┤ "Frozen": {                                  │
702b ───┤   "Title": "Frozen",                         │
702c ───┤   "Type": "movie",                           │
        │   "ReleaseYear: 2010,                        │
702d ───┤   "Ratings": ["R", "NC-17", "X"]             │
702e ───┤   "Genres": ["Action", "Thriller", "Horror", "Drama"], │
702f ───┤   "Language": "eng",                         │
702g ───┤   "Image":                                   │
702h ───┤ "https://upload.wikimedia.org/wikipedia/en/thumb/0/05/Frozen_%282 │
        │ 013_film%29_poster.jpg/220px- Frozen_%282013_film% │
        │ 29_poster.jpg"                               │
702i ───┤   "Duration": 93}                            │
        └─────────────────────────────────────────────┘
                                                FIG. 7A 704 ─┐
        ┌─────────────────────────────────────────────┐
704a ───┤ "Frozen": {                                  │
704b ───┤   "Title": "Frozen",                         │
704c ───┤   "Type": "movie",                           │
        │   "ReleaseYear: 2013,                        │
704d ───┤   "Ratings": ["U", "FSK: 0", "Tous", "G", "6", "General Audience (G)"] │
704e ───┤   "Genres": ["Animation", "Comedy", "Music", "Fantasy"], │
704f ───┤   "Language": "eng",                         │
704g ───┤   "Image":                                   │
704h ───┤ "https://upload.wikimedia.org/wikipedia/en/thumb/0/05/Frozen_%282 │
        │ 013_film%29_poster.jpg/220px-                │
        │ Frozen_%282013_film%29_poster.jpg"           │
704i ───┤   "Duration": 108}                           │
        └─────────────────────────────────────────────┘
                                                FIG. 7B
```

SYSTEMS AND METHODS FOR LEVERAGING ACOUSTIC INFORMATION OF VOICE QUERIES

CROSS-REFERENCE TO RELATED APPLICATIONS

This application is a continuation of U.S. patent application Ser. No. 18/131,100, Apr. 5, 2024, which is a continuation of U.S. patent application Ser. No. 17/255,320, filed Dec. 22, 2020, now U.S. Pat. No. 11,651,020, which is a national stage application under 37 U.S.C. § 371 of International Application PCT/US2020/020206, filed Feb. 27, 2020, which claims priority to U.S. Provisional Application No. 62/843,785 filed May 6, 2019, which are incorporated herein by reference in their entireties.

BACKGROUND

The present disclosure is directed to techniques for leveraging spectral characteristics and acoustic features of a voice query to generate and present enhanced personalization of content items to the querier.

SUMMARY

Human-machine interfaces have evolved such that voice queries and commands are an effective means of control. Consumers interact via voice with electronic devices such as Amazon's Alexa, Apple's Siri and Google Assistant. A user may query via a voice command to such electronic device for content, and the electronic device provides the content that best matches with the user's query. An approach for processing natural language queries may, for example, utilize a conditional random field (CRF) function that combines natural language processing (NLP) techniques with entity identification to determine entity type and further integrates with a search and recommendation system of digital to recommend content to the user. Such integration primarily matches a phrase spoken by a user with entity type weights according to an ontology-based knowledge system in order to search for and recommend content to the user. For example, a query for "Mahatma Gandhi" results in a match of an entity type "Person" and an entity type "Movie," where 46.8% is likely to be relevant (i.e., user's intent in the query) for the entity type "Person" and 48.8% is likely to be relevant for the entity type "Movie." Such relevancy is determined based on the user's behavior in the past on number of times the user has searched for the query for "Mahatma Gandhi" and number of instances when the user selected the entity type "Movie" and on the number of instances when the user selected the entity type "Person." For example, in the mentioned case, the system would send both features—type1: Movie, and type2: Person—to the user. In essence, the function ranks different entity types and passes the rank-ordered list as a feature to the CRF model. Details of this function is described in detail by Venkataraman, S. and Mohaideen N. "A Natural Language Interface for Search and Recommendations of Digital Entertainment 2015.

However, the current NLP and/or voice recognition systems use context in the phrase from the user's voice query without any consideration of attributes of the user and the context itself to rank the content and to provide the results. Such attributes include determining entity (adult/child) of the user who sent the query, a type of content (child-friendly or adult-friendly) associated with the content, and relevancy based on the type of content. Accordingly, techniques are disclosed herein for leveraging acoustic features of the user who sent the query to rank the content for presentation based on the entity of the user and the type of content. Additionally, techniques are disclosed herein for leveraging acoustic features of the user who sent the query for tailoring relevancy of the content based on the entity of the user and type of the content to provide results appropriate/relevant for the user.

In particular, in some embodiments, techniques described herein may be used to leverage acoustic features of the user to personalize search results of content items to present to the user. In some embodiments, after receiving a voice query by a user, a system searches a library of content items to identify a content item that matches the query. Each of the content items is labeled depending on the appropriateness and/or affinity a group of users may have for the content. For example, content items may be labeled as adult entity type for adults and child entity type for children. Other entity types may include labels for a generational age group, such as Gen Z, Gen X or Millennial, dialect, region, or other group information identifiable by audio signatures. Although any classification for any desired group of users could be generated using existing spectral features of audio data, the disclosure will focus on child and adult groups for simplicity. A relevance score indicating a level of affinity of the content item for adults is assigned to each of the content items labeled as the adult entity type. Also, a relevance score indicating a level of affinity of the content item for children is assigned to each of the content items labeled as the child entity type. In some embodiments, a selection is received from the user of the content item. In some embodiments, upon determining that the query is from a child and selection is of the adult entity type content item, the system ranks the content item with the child entity type higher than the content item with the adult entity type to present to the user. In other embodiments, upon determining that the query is from an adult and selection is of the child entity type content item, the system ranks the content item with the adult entity type higher than the content item with the child entity type to present to the user.

In particular, in some embodiments, techniques described herein may be used to leverage acoustic features of the user to tailor relevancy of the content items to present to the user. In some embodiments, when it is determined that the voice query is from a child, the system decreases the relevance score of a content item labeled as the adult entity type by a first value. The system then selects the content item labeled as the child entity type to present to the user. In other embodiments, when it is determined that the voice query is not from a child, but instead from an adult, the system decreases the relevance score of a content item labeled as the child entity type by a second value, which is less than the first value. The system then selects the content item labeled as the adult entity type to present to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3A shows an illustrative example of a table structure listing metadata associated with the content item in accordance with some embodiments of the disclosure;

FIG. 3B shows an illustrative example of an updated table structure of the table structure of FIG. 3A with updated relevance scores based upon the user as a child entity type in accordance with some embodiments of the disclosure;

FIG. 3C shows an illustrative example of an updated table structure of the table structure of FIG. 3A with updated relevance scores based upon the user as an adult entity type in accordance with some embodiments of the disclosure;

FIG. 5 shows an illustrative example of a table listing different classes of features and their corresponding examples in accordance with some embodiments of the disclosure;

FIG. 7A shows an illustrative example of properties of a content item in accordance with some embodiments of the disclosure;

FIG. 7B shows an illustrative example of properties of another content item in accordance with some embodiments of the disclosure;

DETAILED DESCRIPTION

Figure 1:
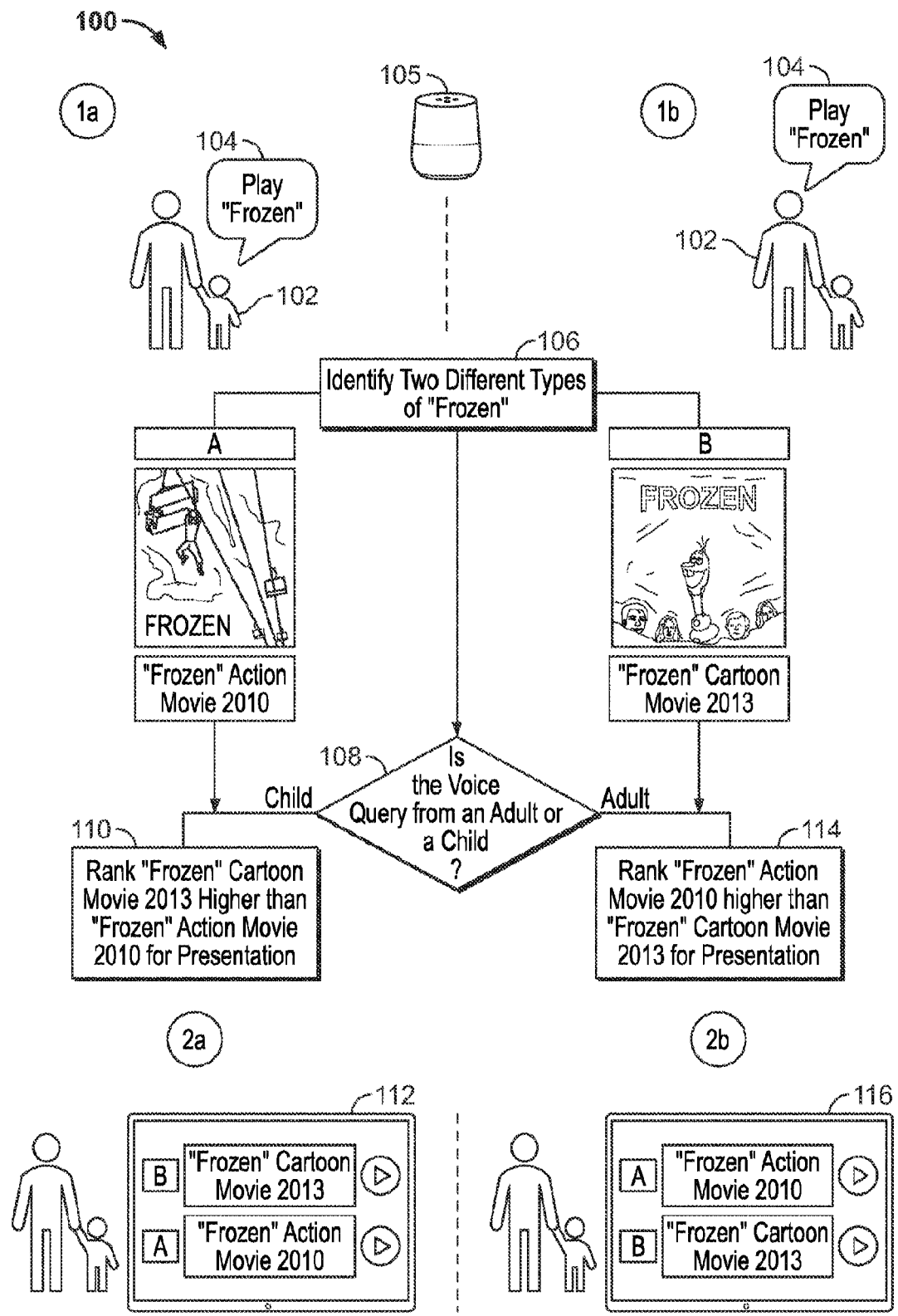
FIG. 1 shows an illustrative example of leveraging acoustic features of a user to present a personalized content item to a user in accordance with some embodiments of the disclosure.

Methods and systems are described herein for leveraging acoustic features of a user to generate and present personalized content item to a user. In some embodiments, a personalized content application determines whether the user requesting a content item is a child or an adult and identifies a content item in a voice query from a user. The method identifies the content item among a plurality of content items as being either a child entity type or an adult entity type. A relevance score defining a level of affinity of the child entity type is assigned to a content item identified as the child entity type and a relevance score defining a level of affinity of the adult entity type is assigned to a content item identified as the adult entity type. As referred to herein, the terms "media asset" and "content item" should be understood to mean an electronically consumable asset, such as online games, virtual, augmented or mixed reality content, direct to consumer live streams (such as that provided by Twitch for example), VR Chat applications, VR video players, 360 video content, television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the method receives a selection of a content item from the user. In some embodiments, upon determination that the user is a child and the selection of the content item is of an adult entity type, the method ranks the content item with the child entity type higher than the content item with the adult entity type to present to the user. In other embodiments, upon determination that the user is an adult and the selection of the content item is of a child entity type, the method ranks the content item with the adult entity type higher than the content item with the child entity type to present to the user.

In some embodiments, upon determination that the user is a child, the system decreases the relevance score of the content item indicating the level of affinity of the adult entity type by a first value and selects a content item with a child entity type to present to the user. In other embodiment, upon determination that the user is an adult, the system decreases the relevance score of the content item indicating the level of affinity of the child entity type item by a second value, which is less than the first value and selects a content item with an adult entity type to present to the user.

In various embodiments described herein, "personalized content application" is a type of application that leverages acoustic features of a user to personalize search results of content and to tailor relevancy of the content to present to the user. In some embodiments, the PMCA may be provided as an on-line application (i.e., provided on a website), or as a stand-alone application on a server, user device, etc. Various devices and platforms that may implement the PMCA are described in more detail below. In some embodiments, the PMCA and/or any instructions for performing any of the embodiments discussed herein may be encoded on computer-readable. Computer-readable includes any capable of storing instructions and/or data. The computer-readable may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, card, register memory, processor caches, Random Access Memory ("RAM"), etc.

In some embodiments, content item may include different types of content such as a child entity type, an adult entity type content and unknown (either both child and adult or neither child nor adult) entity type. In some embodiments, the PMCA assigns metadata to the content item. Such metadata may include a metadata identifier identifying each of the content items and types of the content items such as a child entity type, an adult entity type and unknown entity type. In some embodiments, a content item is determined as adult-entity type, child-entity type or unknown entity type based on the genre and rating of the content item. For example, an adult entity type may include genres such as violence, horror, action, sexual content, etc., having one or more ratings identified as "Restricted (R)," "X," etc. In another example, a child entity type may include genres such as animation, comedy, animated comedy, children, etc., having one or more ratings identified as "Parental Guidance (PG), "Guidance (G)," "TV7," etc. In a further example, a unknown entity type may include genres such as drama, animation, comedy, etc. having one or more ratings identified as "PG," "PG-13," "Tous," "G," etc. In one example, depending on the rating an unknown entity type is defined as a universal genre content, which may or may not fall under adult entity type or child entity type. In another example, depending on the rating, the unknown entity type is defined as a neutral genre content, which falls in both the adult and the child entity type.

In some embodiments, the metadata also includes a relevance score assigned to each of the content items. A relevance score is a value that defines level of affinity of each of the content items based on the type of content item, e.g., adult, child and unknown. For example, a high relevance score for an adult entity type (e.g., "Fifty Shades of Grey") would be considered an extreme adult entity type for a child. A medium reference score of an adult entity type (e.g., "White Boy Rick") would be considered a moderate adult entity type for a child. A low relevance score of an adult entity type would be considered as a slight adult entity type for a child. Similarly, in one example, a high relevance score of a child entity type (e.g., "Teletubbies") would be considered an extreme child entity type for an adult. A medium reference score of a child entity type would be considered moderate child entity type for an adult. A low relevance score of a child entity type (e.g., "Shrek 2") would be considered as slight child entity type for an adult. In other embodiments, a range of values unbounded by the relevance scores for the child-entity type and the adult entity type are assigned to the unknown entity type.

FIG. 1 shows an illustrative example of a flow of operations of the PMCA performed by e.g., control circuitry 406 (FIG. 4) for providing personalized content to a user in accordance with some embodiments of the present disclosure. In particular, FIG. 1 shows a scenario 100 where a voice query 104 (e.g., query "Play Frozen") is received via user input/output device 105 (e.g., digital voice assistant). In some embodiments, the query is received as voice input from user 102.

In some embodiments, a processing circuitry, e.g., natural language processing circuitry 404 (FIG. 4) performs a natural language processing (NLP) application to understand, interpret and process human spoken language data, e.g., the voice query 104. In some embodiments, at block 106, the PMCA identifies "Frozen" as a content item of multiple different types and a relevance score is assigned to each of the multiple different types of content items. For example, a first relevance score is assigned to a content item of adult entity type, a second relevance score is assigned to a content item of child entity type and a third relevance score is assigned to a content item of unknown entity type.

As discussed above, each of the content items is labeled depending on the appropriateness and/or affinity a group of users may have for the content. For example, the adult entity type is for a group having adults as members and the child entity type is for a group having children as members of the group. In some embodiments, the unknown entity type is a group which belongs to both adult entity type group and the child entity type group such that members in the unknown entity type group are both adults and children. In other embodiments, the unknown entity type is a group which belongs to neither the adult entity type group nor the child entity type group such that the system is not able to determine whether the user is an adult or a child. Other entity types may include a group for males and a group for females. Other entity types may include labels for a generational age group, such as Gen Z, Gen X or Millennial, dialect, region, or other group information identifiable by audio signatures. Although any classification for any desired group of users could be generated using existing spectral characteristics and features of audio data.

FIG. 3A shows an illustrative example of a table structure 300 listing content item identifiers 302 as metadata identifying each of the content item, type of entity 304 corresponding to each of the content items and relevance score 306 assigned to each of the content items. As shown in the table structure 300, some examples include "Frozen Action movie 2010" 302a labeled as Adult 304a assigned with 800 as relevance score 306a, "Fifty Shades of Grey" 302b labeled as Adult 304b assigned with 990 as relevance score 306b and "White Boy Rick TV series" 302c labeled as Adult 306b assigned with 700 as relevance score 306c. Other examples include "The Frozen movie 2012" 302d labeled as Unknown 304d assigned with 1300 as relevance score 306d, "Blind Side movie" 302e labeled as Unknown 304e assigned with 1535 as relevance score 306e and "A League of Their Own TV Series" 302f labeled as Unknown 304f assigned with 1389 as relevance score 306f. Further examples include "Frozen Cartoon movie 2019" 302g labeled as Child 304g assigned with 200 as relevance score 306g, "Teletubbies movie" 302h labeled as Child 304h assigned with 100 as relevance score 306h and "Shrek 2 movie" 302i labeled as Child 304i assigned with 300 as relevance score 306i. In one example, a relevance score range from a value of 0 to 1000 is assigned to adult entity types and child entity types.

In one example, values of relevance scores closer to 0 are assigned to content items of the child entity type and values of relevance scores closer to 1000 are assigned to content items of the adult entity type. For example, a value of 990 as the relevance score 306b is assigned to a movie having the content identifier of "Fifty Shades of Grey" 302b since it is considered extremely adult-friendly for a child. In one example, a value of 100 as the relevance score 306h is assigned to a movie having the content identifier of "Teletubbies" 302h since it is considered extremely child-friendly for an adult. In one example, a relevance score higher than the value of 1000 are assigned to the unknown entity type. For example, a value of 1389 as the relevance score 306f is assigned to a movie having the content identifier of "A League of Their Own TV series" 302f and a value of 1535 as the relevance score 306e is assigned to a movie having the content identifier "Blind Side movie" 302e since both are labeled as unknown entity types 304f and 304e respectively. In some embodiments, the value of relevance scores of the unknown entity types closer to the value of 1000 are considered to be more adult-friendly, and the value of relevance scores of unknown entity types farther away from the value of 1000 are considered to be less adult-friendly. Thus, "A League of Their Own TV series," 302f with the value of 1389 as the relevance score 306f is considered to be more adult-friendly than "Blind Side Movie," 302e with the value of 1535 as the relevance score 306e. In some embodiments, the higher the value of the relevance score of the unknown entity type, the less the unknown entity type is considered be either adult entity type or child entity type.

In some embodiments, for example, content identifiers related to the content item "Frozen" include "Frozen Action movie 2010" 302a, "Frozen Cartoon movie 2019" 302g and "The Frozen movie 2012" 302d. In one example, the content identifier "Frozen Action movie 2010" 302a is assigned as an adult entity type 304a and a first relevance score 306a of 800. Thus, "Frozen Action movie 2010" is considered to be highly adult-friendly. In another example, the content identifier "Frozen Cartoon movie 2019," 302g is assigned as a child entity type 304g and a second relevance score 306g of 200. Thus, "Frozen Cartoon movie 2019" is considered to be highly child friendly. In another example, the content identifier "The Frozen movie 2012" 302d is assigned as an unknown entity type 304d having a third relevance score 306d of 1300.

Referring back to FIG. 1 in some embodiments, at block, 106, the PMCA identifies the voice query 102 "Play Frozen" refers to content item of at least two different types and assigns a relevance score to each of the multiple different types of the content items. For example, the PMCA searches the table structure 300 in FIG. 3A to match the query 104. At block, 106, the PMCA identifies at least two different content items of "Frozen." In one example, "Frozen" is identified as "Frozen Action movie 2010" of adult entity type having the first relevance score of 800. In another example, "Frozen" is identified as "Frozen Cartoon movie 2013" of child entity type having the second relevance score of 200. Although not shown, in a further example, "Frozen" is identified as "The Frozen movie 2012" of unknown entity type having the third relevance score of 1300 as shown in the table structure 300 of FIG. 3A.

At block 108, the PMCA determines whether the user 102 who asked for the voice query 104 from the user 102 is a child or an adult. In some embodiments, processing circuitry, e.g., audio processing circuitry 402 (FIG. 4) performs a voice processing application such as automatic speech recognition (ASR) by utilizing acoustic features extracted from audio of the voice query 104 to identify whether the user 102 is a child or an adult. In some embodiments, the voice processing application compares acoustic features of raw audio from the voice query with previously determined acoustic features to determine whether the user 102 is a child, an adult or unknown. In one example, "unknown" is a category assigned to a user when the system is not able to determine whether the user is child or an adult. For example, when the raw audio from the voice query does not match with previously determined acoustic features, the user is identified as unknown. In some embodiments, the automatic speech recognition is also utilized to further identify whether the adult is male or female.

In some embodiments, the PMCA receives a selection of "Frozen Action movie 2010" from the user 102. In one embodiment, the selection is received from the user 102 via the user input/output device 105. In another embodiment, the selection is received from the user 102 via one of user devices (e.g., elements 602, 604 or 606 in FIG. 6). At block 110, the PMCA ranks "Frozen Cartoon movie 2013" higher than "Frozen Action movie 2010" for presentation when the user 102 is determined to be a child at block, 108 and the selection is of the "Frozen Action movie 2010." At block 112, the PMCA generates for presentation "Frozen Cartoon Movie 2013" as having a ranking higher than "Frozen Action Movie 2010." In other embodiments, the PMCA receives a selection of the "Frozen Cartoon movie 2013" from the user 102. At block 114, PMCA ranks the "Frozen Action movie 2010" higher than "Frozen Cartoon movie 2013" for presentation when the user 102 is determined to be an adult at block 108 and the selection is of "Frozen Cartoon movie 2013." At block, 116, the PMCA generates for presentation "Frozen Action Movie 2010" as having a ranking higher than the "Frozen Cartoon Movie 2013".

Figure 2:
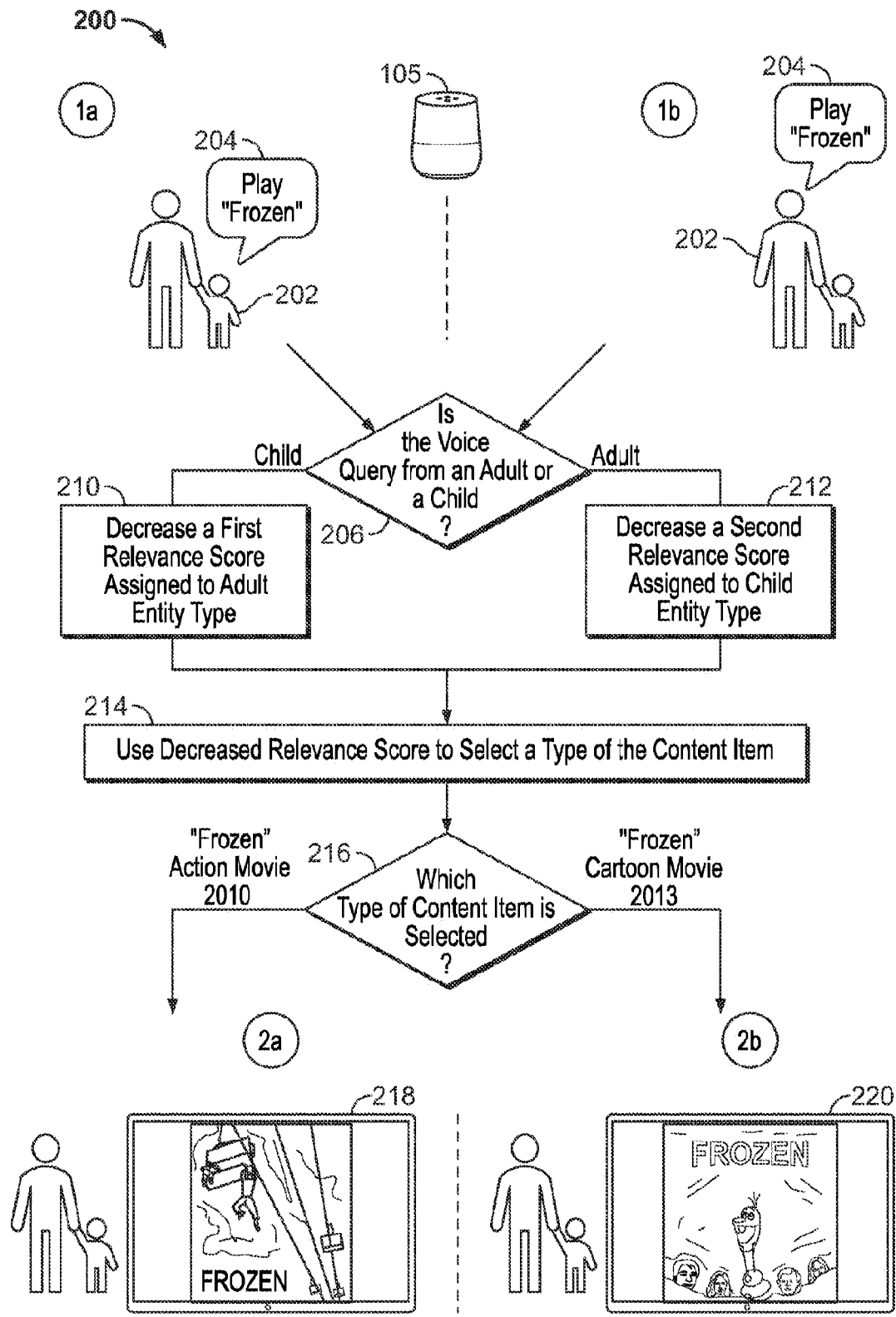
FIG. 2 shows an illustrative example of leveraging acoustic features of a user to tailor relevancy of content item to present a personalized content item to the user in accordance with some embodiments of the disclosure.

FIG. 2 shows an illustrative example of a flow of steps of the PMCA performed by e.g., control circuitry 406 (FIG. 4) for providing personalized content to a user in accordance with other embodiments of the present disclosure. In particular, FIG. 2 shows a scenario 200 where a voice query 204 (e.g., query "Play Frozen") similar to voice query 104 in FIG. 1 is received via user input/output device 205 (e.g., digital voice assistant) similar to the device 105 in FIG. 1. In some embodiments, the query is received as voice input from user 202 similar to user 102 in FIG. 1

In some embodiments, at block 206, PMCA determines whether user 202 who asked the voice query 204 is a child or an adult. In some embodiments, the PMCA utilizes the voice processing application similarly to as discussed above to identify whether user 102 is a child or an adult. In some embodiments, the PMCA searches the table structure 300 in FIG. 3A to match the query 204. In some embodiments, the PMCA identifies that the voice query 202 "Play Frozen" refers to content items of at least two different types and a relevance score assigned to each of the multiple different types of the content items. In one example, Frozen is identified as "Frozen Action movie 2010" of adult entity type having a first relevance score of 800. In another example, Frozen is identified as "Frozen Cartoon movie 2013" of child entity type having a second relevance score of 200. Although not shown, in a further example, Frozen is identified as a "The Frozen movie 2012" of unknown entity type having a third relevance score of 1300, as shown in the table structure 300 of FIG. 3A.

As discussed above, each of the content items is labeled depending on the appropriateness and/or affinity a group of users may have for the content item. For example, the adult entity type is for a group having adults as members and the child entity type is for a group having children as members of the group. Other entity types may include labels for males and females. Other entity types may include labels for a generational age group, such as Gen Z, Gen X or Millennial, dialect, region, or other group information identifiable by audio signatures. Although any classification for any desired group of users could be generated using existing spectral characteristics and features of audio data.

Referring back to FIG. 2, in some embodiments, when, at block 206, it is determined that user 202 is a child, the PMCA decreases the first relevance score assigned to the adult entity type at block 210. In some embodiments, the PMCA decreases the first relevance score by a first value. In one example, the first value is in the range of 50%-75%. In other embodiments, the PMCA increases the second relevance score within a range of 10%-20%.

In one example, the relevance score of 800 in Table 300 of FIG. 3A assigned to the content identifier "Frozen Action movie 2010" is decreased by the first value. For example, the PMCA reduces the first relevance score 306a of 800 to 350, as shown in first updated table structure 310 in FIG. 3B. Accordingly, the value of the first relevance score 306a in the first updated table structure 310 is now 350. In another example, the PMCA increases the second relevance score 306g of 200 assigned to the content identifier "Frozen Cartoon movie 2013" by the second value. For example, the second relevance score 306g of 200 is increased to 230, as shown in the first updated table structure 310 in FIG. 3B. Accordingly, the value of the second relevance score 306g in the first updated table structure 310 is now 230.

Referring back to FIG. 2, in some embodiments, when at block, 206, it is determined that user 202 is a child, the PMCA decreases a second relevance score assigned to the child entity type at block 212. In some embodiments, the PMCA decreases the second relevance score by a second value, which is lower than the first value. In one example, the second value is significantly lower than the first value. For example, the second value is in the range of 5%-10%. In other embodiments, the PMCA increases the first relevance score by a range of 10%-20%. In one example, the second relevance score of 300 in Table 300 of FIG. 3A assigned to the content identifier "Frozen Cartoon movie 2013" is decreased by the second value. For example, the PMCA reduces the second relevance score of 200 to 160, as shown in the second updated table structure 320 in FIG. 3C. In another example, the PMCA increases the first relevance score of 800 assigned to the content identifier "Frozen Action movie 2010." For example, the first relevance score of 800 is increased to 870, as shown in the second updated table structure 320 in FIG. 3C.

Referring back to FIG. 2, at block 214, the PMCA uses the decreased relevance scores to select either the content item e.g., "Frozen Cartoon movie 2013" or "Frozen Action movie 2010." When at block 210, the first relevance score is decreased, then at block, 214, the PMCA selects "Frozen Cartoon movie 2013." When at block 212, the second relevance score is decreased then at the block 214, the PMCA selects "Frozen Action movie 2010." At block 216, the PMCA determines which type of the content item was selected at block 214. In some embodiments, at block 216, the PMCA determines that "Frozen Cartoon movie 2013" was selected and presents the "Frozen Cartoon movie 2013" to the user 102 on a user device 218 (e.g., 602, 604 or 606 of FIG. 6). In other embodiments, when it is determined that "Frozen Action Movie 2010" was selected at block 216, the PMCA presents "Frozen Action Movie 2010" to the user 102 on a user device 220 (e.g., 602, 604 or 606 of FIG. 6).

In some embodiments, the PMCA uses both the decreased first relevance score and the second relevance score to select both "Frozen Cartoon movie 2013" and "Frozen Action movie 2010" to present to the user when the user is determined to be the adult. In some embodiments, the PCMA uses the decreased first relevance score, the decreased relevance score and the third relevance score to select all three, i.e. "Frozen Cartoon movie 2013," "Frozen Action movie 2010" and "The Frozen movie 2012" to present to the user when the user is determined to be the adult.

As discussed above, values of the third relevance score of the unknown entity type closer to the value of adult-friendly content, e.g., closer to 1000, are considered to be more adult-friendly content. In some embodiments, the PMCA decreases the third relevance score of the unknown entity type by a third value when the value of the third relevance score of an unknown entity type is closer to the value of adult-friendly content, e.g. closer to 1000, and when the user is determined to be a child. In one example, the third value is in the range of 10%-20%. In one example, the third relevance score of "The Frozen movie 2012" as shown in Table 300 in FIG. 3A is 1300, which is considered closer to the value of 1000 and thus is considered to be more adult-friendly content. In some embodiments, the PMCA decreases the relevance score of "The Frozen movie 2012" from 1300 to 1100 when user is determined is to be the child. In other embodiments, PMCA decreases the third relevance score of the unknown entity type by a fourth value when the value of third relevance score is closer to the first relevance score and when the user is determined to be the adult. In some embodiments, the fourth value is less than the third value. In one example, the fourth value is in the range of 0.5% to 1.5%. Referring back to the example of the third relevance score of "The Frozen movie 2012" as shown in Table 300 in FIG. 3A is 1300 which closer to the value of 1000 and thus is considered to be more adult-friendly content. In one example, the PMCA decreases the third relevance score of "The Frozen movie 2012" is from 1300 to 1250 when the user is determined to be an adult.

In the embodiment illustrated in FIG. 2, the content item is a video displayed to the user on the user equipment device 218. However, it should be understood that the systems and methods disclosed herein could also be used to present any content type, for example, audio, music, data files, web pages, advertising, etc.

As discussed above, in some embodiments, the PMCA reduces the relevance score based on whether the user requesting the content item is a child or an adult. In some embodiments, when the user is a child, the first relevance score associated with the content item of the adult entity type is reduced by the first value (e.g., 50%-75%) which is significantly high. In other embodiments, when the user is an adult, the second relevance score associated with the content item of the child entity type is reduced by the second value (e.g., 5%-10%), which is significantly lower than the first value. Thus, the content item of the adult entity type is highly penalized when the user is a child and the content item of the child entity type is only slightly penalized when the user is an adult. As discussed above, the unknown entity type is considered to be more adult entity type when the third relevance score associated with the content item of the unknown entity type is closer to the first relevance score. In some embodiments, when the user is a child, the third relevance score associated with the content item of the unknown entity type is reduced by the third value when the unknown entity type is considered to be more adult-friendly content. Thus, the content item of the unknown entity type is highly penalized when the user is a child and value of the third relevance score of the unknown entity type is closer to the value of the first relevance score of the adult-friendly content. In other embodiments, when the user is an adult, the third relevance score associated with the content item of the unknown entity type is reduced by the fourth value when the unknown entity type is considered to be more adult-friendly content. Thus, the content item of the unknown entity type item is slightly penalized when the user is the adult and the value of the third relevance score of the unknown entity type is closer to the value of the first relevance score of the adult-friendly type. In some embodiments, the relevance score is adjusted according to the equation below.

$$F(\text{demography, phrase, entity}) =$$

$$F_{ex}(\text{phrase, entity}) - \sum_{d=0}^{k} a_d \times rel_d(D_d, \text{entity}) \times (1 - sim(\text{demography}, D_d))$$

$D_d$ = Demography class, for example in our case $D_0$ was ADULT, $$D_d \text{ KID, and } D_2, \text{UNKNOWN}.$$

$F_{ex} =$

Existing scoring function for scoring relevance from phrase to entity.

$a_d$ = Configurable coefficient for each $D_d$.

$rel_d$ = Relevance function optimized for each demography.

$sim$ = A similarity function for two demography's, max is 1 when $D_d$ is the current user demography and min is 0.

In the above equation, a $F_{ex}$ is an existing scoring function that provides relevance from phrase to entity, i.e. this function primarily matches the phrase to entity type weights as discussed above. Three conditional factors described in the equation above determine adjusting of the relevancy score. The first factor is the entity type, e.g., demography, $D_d$, which is changeable. The $D_d$ identifies the content item as adult entity type, child entity type and unknown entity type. The second factor is relevance score (function) $rel_d$, which is retrieved from the table 300 in FIG. 3 and updated based on the $D_d$. The third factor is sim, which is a similarity between the entity types. For example, an unknown entity type of the content item may be considered similar to the adult entity type of the content item. Thus, the existing scoring function $F_{ex}$ is modified to add these conditional factors to reduce the relevance score of the content item based on the entity type (adult, child, unknown) such that function F (demography, phrase entity) results in high penalties of relevance scores for the adult entity type when the voice query is from a child and low penalties of relevance scores for the child entity type when the voice query is from an adult.

Accordingly, in some embodiments, based on the decreased relevance score, i.e., drastically decreased relevance score of the adult entity type, the PMCA ensures that the highly penalized adult entity type is not selected to be presented to a child. In other embodiments, based on the drastically decreased of the relevance score of the unknown entity type, the PMCA ensures that the content item of the unknown entity type is not selected to be presented to a child. In other embodiments, based on the increased relevance scores, i.e., slightly increased relevance score of child entity type, the PMCA ensures that the child entity type is selected to be presented to the child.

Accordingly, in some embodiments, based on the decreased relevance score, i.e., slightly decreased relevance score of the child entity type, the PMCA ensures that the slightly penalized child entity type is not selected to be presented to an adult. Accordingly, in other embodiments, based on the increased relevance scores, i.e., slightly increased relevance score of the adult entity type, the PMCA ensures that the adult entity type is presented to an adult. In other embodiments, based on the slightly decreased relevance score of the unknown type, the PMCA ensures that the unknown entity type is presented to the adult for selection.

Figure 4:
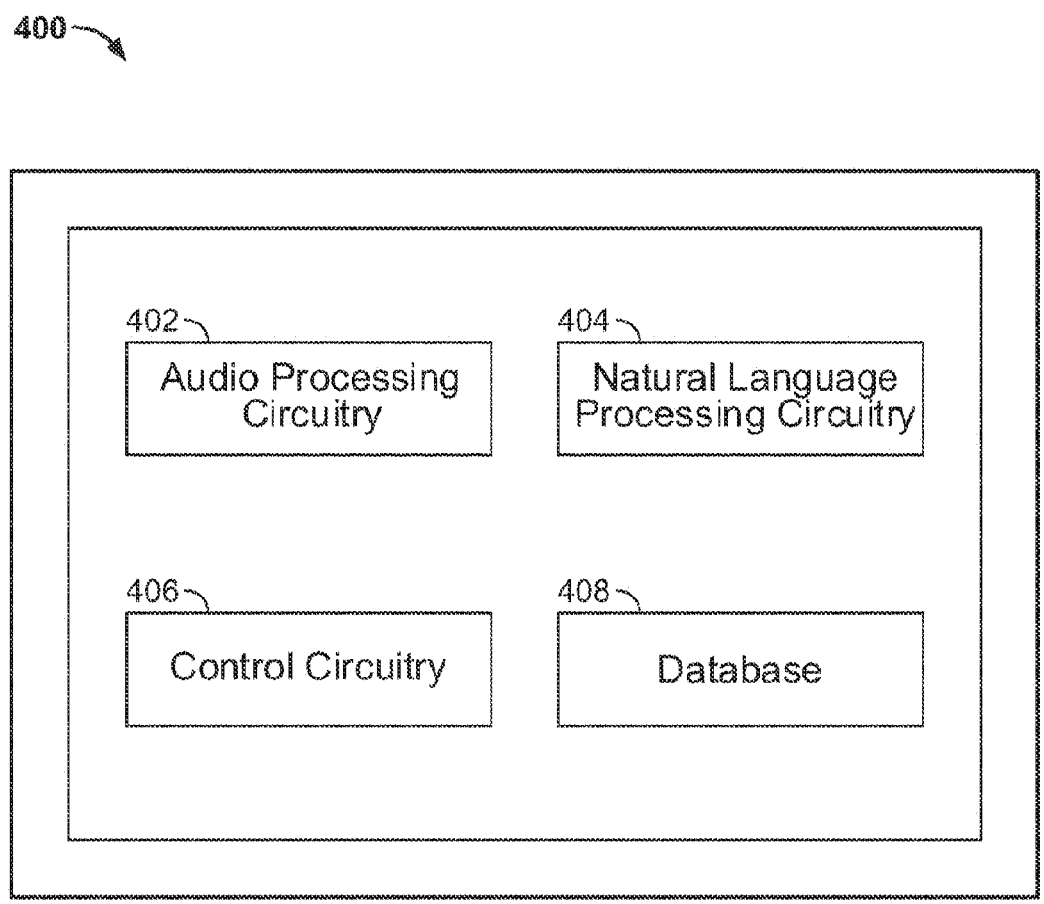
FIG. 4 depicts a block, diagram of an illustrative example of a system in accordance with some embodiments of the disclosure.

FIG. 4 illustrates an example of an exemplary system 400 for leveraging acoustic features of a user to generate and present personalized content to the user. In some embodiments, the system includes audio processing circuitry 402, a natural language processing (NLP) circuitry 404, control circuitry 406 and a database 408. The audio processing circuitry 402 performs the voice processing application by utilizing acoustic features extracted from audio of the voice query (e.g., 102, 202) to identify the user as a child, an adult or unknown. In some embodiments, the voice processing application compares acoustic features of a raw audio from the voice query with previously determined acoustic features to determine whether the user is a child, an adult or unknown. In one example, "unknown" is a category assigned to a user when system is not able to determine whether the user is child or an adult. For example, when the raw audio from the voice query does not match with the previously determined acoustic features, the user is identified as unknown. In some embodiments, the automatic speech recognition is also utilized to further identify whether the adult is male or female. In some embodiments, the audio processing circuitry 402 transmits the identity (adult, child or unknown) of the user to the control circuitry 406. The NLP circuitry 404 utilizes performs the NLP application to understand, interpret and process human spoken language data, e.g., the voice query (e.g., 104, 204). Some examples of NPL applications include speech recognition, machine translation and Chatbots to understand, interpret and manipulate human spoken language. In some embodiments, the NLP circuitry 404 transmits this processed data to the control circuitry 406.

In some embodiments, the control circuitry 406 utilizes the processed data to identify one or more content item identifiers (e.g., 302 of FIG. 3A) of the content items stored in the database 408 (e.g., table structure 300 of FIG. 3A). In some embodiments, the control circuitry 406 receives a selection of the content item from the user. In some embodiments, the control circuitry 406 utilizes the identity of the user and the selection from the user to rank the content item. In some embodiments, the control circuitry 406 ranks the content item of the child entity type to be higher than the content item of the adult entity type when the user is a child and selects the content item of the adult-friendly content. In other embodiments, the control circuitry 406 ranks the content item of the adult entity type to be higher than the content item of the child entity type when the user is an adult and selects the content item of the child entity type. In some embodiments, the control circuitry 406 utilizes the identity of the user and the processed data to decrease the relevance scores (e.g., 306 of FIG. 3A) corresponding to the child entity type and the adult entity type of the content items stored in the database 408 (e.g., table structure 300 of FIG. 3A) and selects the content item appropriate to the user based on the decreased scores. As discussed above, in some embodiments, control circuitry 406 decreases the relevance score corresponding to the content item of the adult entity type by the first value when the query for the content item is from a child. Thus, the database 408 is updated with this decreased relevance scores, e.g., table structure 310 of FIG. 3B. Also, as discussed above, in other embodiments, the control circuitry 406 decreases the relevance score corresponding to the content item of the child entity type by the second value when the query for the content item is from an adult. Thus, the database 408 is updated with these decreased relevance score, e.g., table structure 320 of FIG. 3C.

As discussed above, in some embodiments, acoustic features extracted from audio of the voice query are used to identify whether the user is a child, adult or unknown. In some embodiments, the audio processing circuitry 402 utilizes the voice processing application to compare acoustic features of a raw audio from the voice query with previously determined acoustic features to determine whether the user is a child, an adult or unknown. These previously determined acoustic features are determined based on training a voice processing algorithm using several thousands of audio files spoken by both children and adults, which were then utilized to predict whether the user is a child, adult or unknown. This prediction is utilized to apply supervised learning. Examples of taxonomy of acoustic features used for the prediction are shown in Table 500 in FIG. 5. Table 500 includes feature class 502 and feature class examples 504 corresponding to the feature class 502. As shown, some examples of different classes of features include mel-frequency cepstral coefficients (MFCCs) 502a with corresponding classifications 504a including deltas, double deltas (mean, stddev); harmonics 502b with corresponding classifications 504b including hand-crafted (total harmonic distortion); pitch 502c with corresponding classifications 504c including fundamental frequency (f0), jitter; intensity 502d with corresponding classifications 504d including loudness, shimmer; speech rate 502e with corresponding classifications 504e including voiced-to-unvoiced ratio, estimated number of syllables/pauses and datetime 502f with corresponding classifications 504f including time of day, day of week, weekday/weekend.

Additional details of utilizing taxonomy of features used for prediction to determine whether the user is one of a child, adult or unknown are provided in Tiwari, V. "MFCC and its applications in speaker recognition" in: International Journal on Emerging Technologies, 2010, Vol. 1 (1). pp. 19 to 22; Boersma, P. "Accurate short-term analysis of the fundamental frequency and the harmonics-to-noise ratio of a sampled sound: in: Proceedings of the Institute of Phonetic Sciences 1993, 17. pp. 97-110; Farrús, M., Hernando, J. Ejarque "Jitter and Shimmer Measurements for Speaker Recognition" in: Proceedings of the Annual Conference of the International Speech Communication Association, INTERSPEECH, 2007, Vol. 2. pp. 1153 to 1156 and De Jong, N. H., Wempe, T. "Praat script to detect syllable nuclei and measure speech rate automatically" in: Behavior Research Methods. 2009, Vol. 41 (2). pp. 385 to 390, Zhou, Z. H. "Ensemble Methods" in: Foundations and Algorithms, 2012 and Chen, T. and Guestrin, C. "XGBoost: A Scalable Tree Boosting System;" in: Proceedings of the $22^{nd}$ ACM SIGKDD International Conference on Knowledge Discovery and Data Mining, 2016, pp. 785-794. In some embodiments, acoustic features extracted from audio of the voice query are used to identify and/or link the user within a household environment without explicit action required by the user. Additional details of utilizing acoustic information to determine the user at such granular level is provided in Wang, W., Zheng, V. W. and Miao, C. "A Survey of Zero-Shot Learning Settings, Methods, and Applications" in: ACM Transactions on Intelligent Systems and Technology (TIST) February 2019 Vol. 10 (2).

Figure 6:
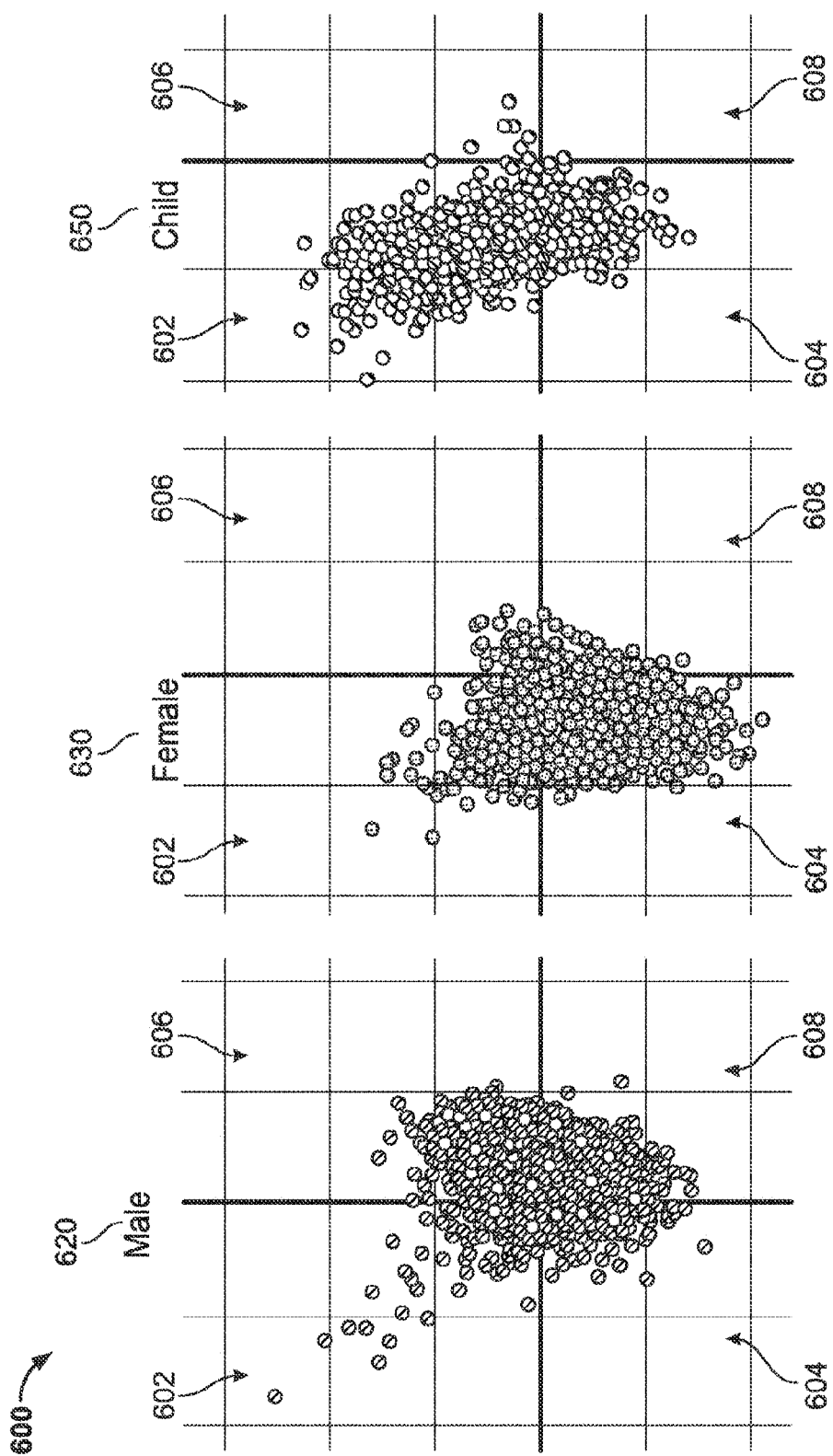
FIG. 6 shows an illustrative example of a graphical representation of spectral characteristics of the features in accordance with some embodiments of the disclosure.

In one embodiment, the audio processing circuitry 402 trains the voice processing application to identify speaker with a voice query as one of an adult (male or female) or a child from acoustic features. In one example, such acoustic features from raw audio files are digitized as floating points (utilizing for example, a dimensionality reduction algorithm) and represented as spectral characteristics in a graphical representation (graph) 600 as illustrated in FIG. 6. In one example, the graph 600 includes four quadrants, upper left 602, lower left 604, upper right 606 and lower right 608. In one embodiment, voice processing application identifies the speaker from these spectral characteristics that fits into one of the quadrants of the graph 600. In one example, when spectral characteristics of a voice falls approximately inside the right quadrants (i.e. upper right 606 and lower right 608) the speaker is determined to be an adult male 620. In another example, when spectral characteristics of a voice that falls approximately inside the left quadrants (i.e. upper left 602 and lower left 604), the speaker is determined to be an adult female 630. In a further example, spectral characteristics of a voice that falls approximately inside the upper left quadrant (i.e. 602), the speaker is determined to be a child 650.

In some embodiments, the NLP circuitry 404 utilizes a speech to text processing algorithm to convert speech to text on previously determined acoustic features of a raw audio from the voice query. These previously determined acoustic features are converted to text to determine which content item the user is referring to in the query. In some embodiments, the NLP circuitry 404 utilizes the speech to text processing application to compare with the previously converted text to determine which content item the user is referring to in the query. These previously converted text are determined based on training a NLP algorithm using several thousands of audio files spoken by both children and adults, which were then converted to text to determine the item. This determination is utilized for supervised learning.

In some embodiments, control circuitry 406 is configured to metadata tagging, which is built around voice search system. When the content items are determined, they are labeled as child entity type, adult entity type or unknown entity type. This is usually done by mining multiple sources such as encyclopedias and catalogues for relevant phrases, facts, and relations about content item using named entity recognition as provided in detail in Nothman, J., Ringland, N., Radford, W., Murphy, T., and Curran, J. R. "Learning multilingual named entity recognition from Wikipedia" in: Artificial Intelligence, 2013, Vol. 194. pp. 151-175. For example, information on properties of the movie "Frozen" may be mined from Wikipedia and stored as a java script object notation (JSON). An example of the JSON for "Frozen Action movie 2010" is illustrated as 702 in FIG. 7A. The information on the properties of the movie "Frozen" stored in the JSONs 702 include metadata such term "Frozen" 702a, Title, 702b, Type, 702c, Release Year 702d, Ratings 702e, Genres 702f, Language 702g, Image 702h and Duration 702i. An example of the JSON "Frozen Cartoon movie 2013" is illustrated as 704 in FIG. 7B. The information on the properties of the movie "Frozen" stored in the JSONs 702 include metadata such term "Frozen" 704a, Title, 704b, Type, 704c, Release Year 704d, Ratings 704e, Genres 704f, Language 704g, Image 704h and Duration 704i. In one embodiment, control circuitry 406 is configured to analyze the information stored in the JSON 702 to determine that the "Frozen Action movie 2010" is an adult entity type as shown in the table 300 in FIG. 3A. In another embodiment, control circuitry 406 is configured to analyze the information stored in the JSON 704 to determine that the "Frozen Cartoon movie 2013" is a child entity type as shown in the table 300 in FIG. 3A.

In some embodiments, the control circuitry 406 is configured to the metadata tagging based on age relevance such that some content items are labeled as the adult entity type and other content items are labeled as child entity type and some content items may be labeled as the unknown entity type. After genre labelling, the control circuitry 406 calculates relevance scored defining affinity level of each content item towards demographic information such as child entity type, adult entity type and unknown entity types genres is calculated. In some embodiments, genre importance is calculated using a simple term frequency-inverse document frequency (tf-idf) weighting, which may cause popular genres like action, comedy, and drama to become irrelevant. In one embodiment, the control circuitry calculates relevance score of 800 for the "Frozen Action movie 2010" labeled as adult entity type, calculates relevance score of 200 for the "Frozen Cartoon movie 2013" labeled as child entity type and calculates relevance score of 1300 for the "The Frozen movie 2012" labeled as unknown entity type as shown in the table 300 in FIG. 3A. Accordingly, each of the content items are labeled with a type of entity and assigned a relevance score prior to user searching for these content items to personalize the search results in order to present the content items to the user.

In some embodiments, control circuitry 406 trains a ranking algorithm to rank content items based on the voice query and selection of the content item. Such training includes analyzing several thousand of raw audio files to detect the user to be one of a child, adult or unknown, determining multiple types of content items the user is referring to in the audio, receiving a selection of the content item, searching the database to determine the relevance score assigned to the multiple content items and ranking the content items based on the relevance score.

In other embodiments, control circuitry 406 trains a scoring algorithm to tailor the relevance scores of the content items based on the voice query and selection of the content item. Such training includes analyzing several thousand of raw audio files to detect the user to be one of a child, adult or unknown, determining multiple types of content items the user is referring to in the audio, searching the database to determine the score assigned to the multiple content items and modifying the relevance scores of the content items based on the type of content item and the user.

Thus, through acoustic feature extraction, demographic information about users is inferred, which in turn enables the system 400 to make use of augmented metadata (type of content item, entity type and relevance score) and an optimized natural language processing during the process of content retrieval for further processing results in providing an enhanced personalization for content items in domain.

Figure 8:
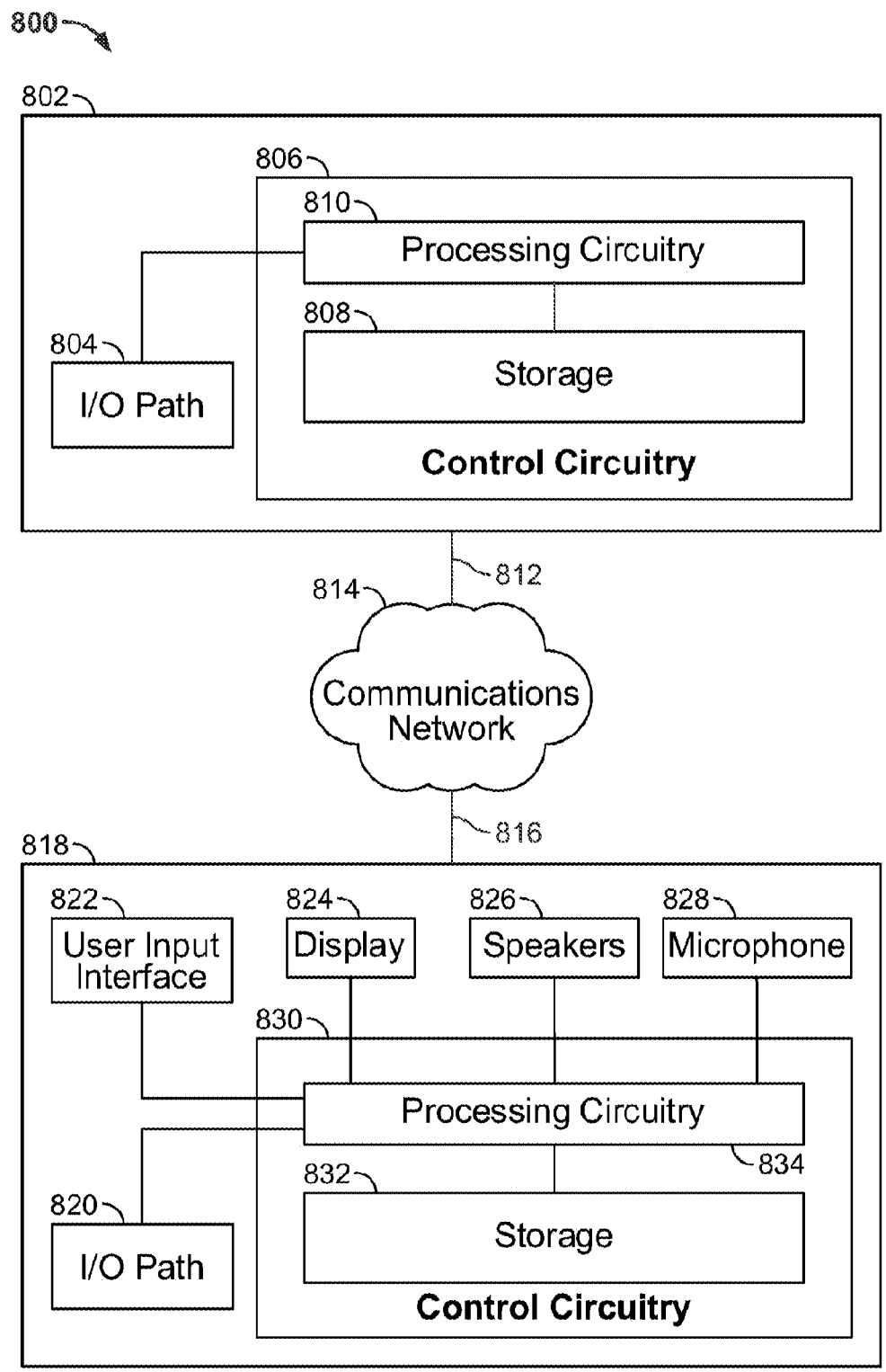
FIG. 8 depicts a block, diagram of an illustrative system in accordance with some embodiments of the disclosure.
Figure 9:
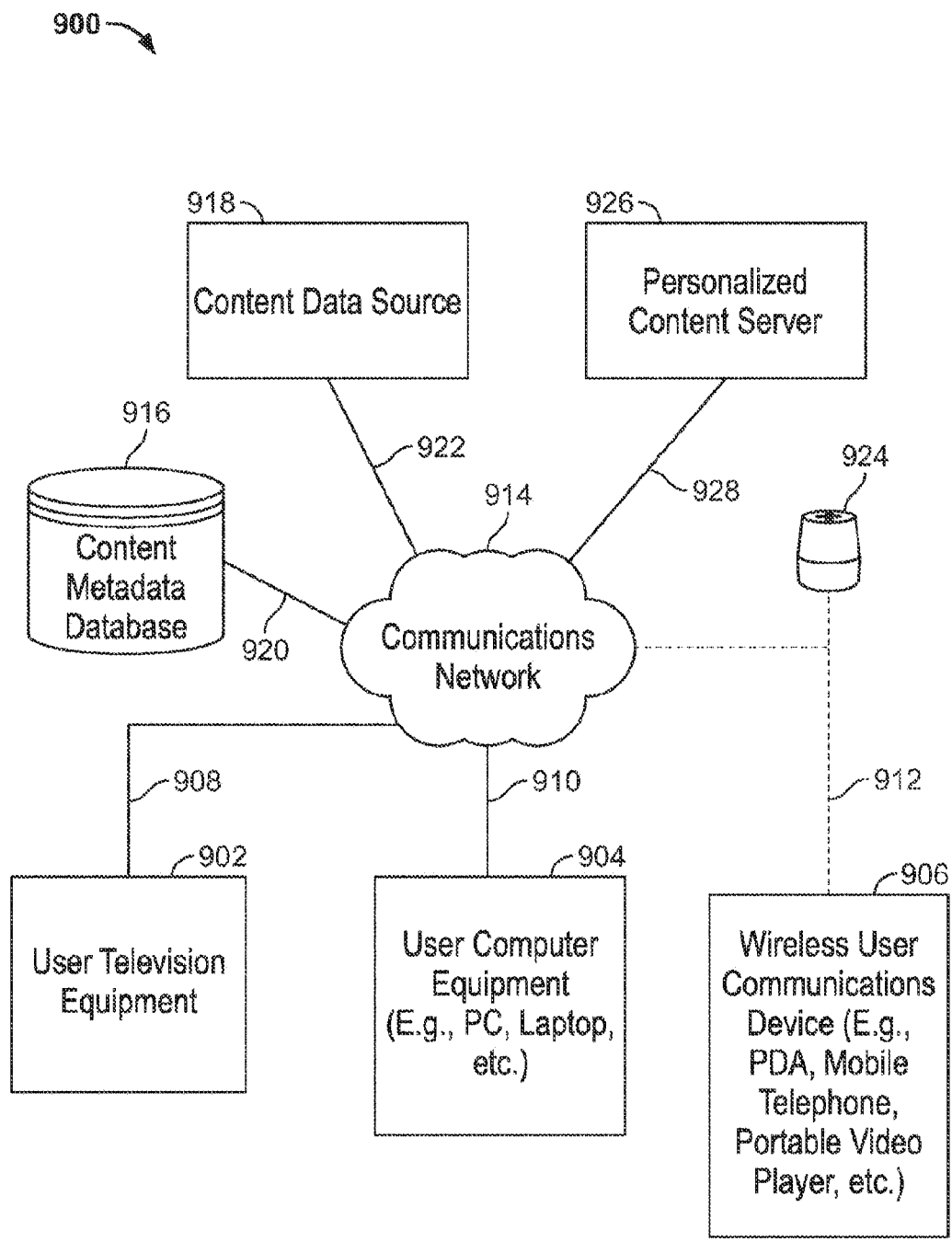
FIG. 9 depicts a block, diagram of an illustrative system in accordance with some embodiments of the disclosure.

FIGS. 8-9 describe exemplary devices, systems, servers, and related hardware for leveraging acoustic features of a user to generate and present the personalized content to the user. FIG. 8 shows a generalized embodiment of illustrative server 802 connected with illustrative remote user equipment device 818. More specific implementation of the devices are discussed below in connection with FIG. 8.

System 800 is depicted having server 802 connected with remote user equipment 818 (e.g., a user's digital voice assistant or a user's smartphone) via communications network 814. For convenience, because the system 800 is described from the perspective of the server 802, the remote user equipment 818 is described as being remote (i.e., with respect to the server 802). The remote user equipment 818 may be connected to the communications network 814 via a wired or wireless connection and may receive content and data via input/output (hereinafter "I/O") path 820. The server 802 may be connected to the communications network 814 via a wired or wireless connection and may receive content and data via I/O path 804. The I/O path 804 and/or the I/O path 820 may provide content (e.g., broadcast programming, on-demand programming, Internet content, and other video, audio, or information) and data to remote control circuitry 830 and/or control circuitry 824, which includes remote processing circuitry 834 and storage 832, and/or processing circuitry 810 and storage 808. The remote control circuitry 830 may be used to send and receive commands, requests, and other suitable data using the I/O path 820. The I/O path 820 may connect the remote control circuitry 830 (and specifically remote processing circuitry 834) to one or more communications paths (described below). Likewise, the control circuitry 806 may be used to send and receive commands, requests, and other suitable data using the I/O path 804. I/O functions may be provided by one or more of these communications paths, but are shown as a single path in FIG. 8 to avoid overcomplicating the drawing.

The remote control circuitry 830 and the control circuitry 806 may be based on any suitable remote processing circuitry such as processing circuitry based on one or more microprocessors, microcontrollers, digital signal processors, programmable logic devices, etc. In some embodiments, the control circuitry 806 executes instructions for a voice processing application, natural language processing application, and a personalized content application stored in memory (i.e., the storage 808). In client-server based embodiments, the control circuitry 806 may include communications circuitry suitable for communicating with remote user equipment (e.g., the remote user equipment 818) or other networks or servers. For example, the PMCA may include a first application on the server 802 and may communicate via the I/O path 812 over the communications network 814 to the remote user equipment 818 associated with a second application of the personalized content application. Additionally, the other ones of the voice processing, natural language processing may be stored in the remote storage 832. In some embodiments, the remote control circuitry, the remote control circuitry 830 may execute the PMCA to process ranking of the content items by leveraging acoustic features of the user to generate presentation of the content items according to their ranks. In other embodiments, the remote control circuitry 830 may execute the PMCA to process tailoring of relevancy of the content items by leveraging acoustic features of a user to select and present the personalized content to the server 802. The PMCA (or any of the other applications) may coordinate communication over communications circuitry between the first application on the server and the second application on the remote user equipment. Communications circuitry may include a modem or other circuitry for connecting to a wired or wireless local or remote communications network. Such communications may involve the Internet or any other suitable communications networks or paths (which is described in more detail in connection with FIG. 9). In addition, communications circuitry may include circuitry that enables peer-to-peer communication of user equipment devices (e.g., WiFi-direct, Bluetooth, etc.), or communication of user equipment devices in locations remote from each other.

Memory (e.g., random-access memory, read-only memory, or any other suitable memory), hard drives, optical drives, or any other suitable fixed or removable storage devices may be provided as the remote storage 832 and/or the storage 808. The remote storage 832 and/or the storage 808 may include one or more of the above types of storage devices. The remote storage 832 and/or storage 808 may be used to store various types of content described herein and voice processing application data, natural language processing data, PMCA data including content, metadata (content identifier, entity type, relevance score) for the content, user profiles, or other data used in operating the voice processing application, natural language processing application and personalized content application. Nonvolatile memory may also be used (e.g., to launch a boot-up routine and other instructions). Although the applications are described as being stored in the storage 806 and/or the remote storage 832, the applications may include additional hardware or software that may not be included in storages 808 and 832.

A user may control the remote control circuitry 830 using user input interface 822. The user input interface 822 may be any suitable user interface, such as a remote control, mouse, trackball, keypad, keyboard, touch screen, touch pad, stylus input, joystick, microphone, voice recognition interface, or other user input interfaces. Display 824 may be provided as a stand-alone device or integrated with other elements of the remote user equipment 818. The display 812 may be one or more of a monitor, a television, a liquid crystal display (LCD) for a mobile device, or any other suitable equipment for displaying visual images. Speakers 814 may be provided as integrated with other elements of the remote user equipment 818 or may be stand-alone units.

The voice processing application, natural language processing application, and a PMCA may be implemented using any suitable architecture. For example, they may be a stand-alone application wholly implemented on the server 802. In other embodiments, some of the application may be client-server based application. For example, the voice processing application may be a client-server based application. Data for use by a thick or thin client implemented on remote user equipment 818 may be retrieved on-demand by issuing requests to a server (e.g., the server 802) remote to the user equipment. In other embodiments, the server may be omitted and the application may be implemented on the remote user equipment.

In some embodiments, as described above, the voice processing application, natural language processing application, and a PMCA may be implemented on the server 802. In this example, the remote user equipment 818 simply provides captured audio of a voice query to the server 802. However, this is only an example, and in other embodiments the applications may be implemented on a plurality of devices (e.g., the remote user equipment 818 and the server 802) to execute the features and functionalities of the applications. The applications may be configured such that features that require processing capabilities beyond the remote user equipment 818 are performed on the server 802 server while other capabilities of the applications are performed on remote user equipment 832.

Though exemplary system 800 is depicted having two devices implementing the voice processing application, natural language processing application, and a personalized content application, any number of devices may be used.

System 800 of FIG. 8 can be implemented in system 900 of FIG. 9 as user television equipment 902, user computer equipment 904, wireless user communications device 905, voice assistant device 924, or any other type of user equipment suitable for interfacing with the voice processing application, natural language processing application and personalized content application. For simplicity, these devices may be referred to herein collectively as user equipment or user equipment devices. User equipment devices, on which an application is at least partially implemented, may function as a standalone device or may be part of a network of devices (e.g., each device may comprise an individual module of the personalized content application). Various network configurations of devices may be implemented and are discussed in more detail below.

User television equipment 902 may include a set-top box, an integrated receiver decoder (IRD) for handling satellite television, a television set, a digital storage device, a DVD recorder, a local server, or other user television equipment. One or more of these devices may be integrated to be a single device, if desired. User computer equipment 904 may include a PC, a laptop, a tablet, a personal computer television (PC/TV), a PC server, a PC center, or other user computer equipment. Wireless user communications device 906 may include a mobile telephone, a portable video player, a portable music player, a portable gaming machine, a wireless remote control, or other wireless devices. Voice assistant device 924 may include a smart speaker, a stand-alone voice assistant, smarthome hub, etc.

It should be noted that the lines have become blurred when trying to classify a device as one of the above devices. In fact, each of user television equipment 902, user computer equipment 904, wireless user communications device 906, voice control device 924, and IOT device 928 may utilize at least some of the system features described above in connection with FIG. 8 and, as a result, include some or all of the features of the voice processing application, natural language processing application and PMCA described herein. For example, user television equipment 902 may implement a voice processing application that is activated upon detecting a voice input comprising a keyword. The voice processing application may also have the same layout on the various different types of user equipment or may be tailored to the display capabilities of the user equipment. For example, on user computer equipment 906, the voice processing application may be provided in a visual layout where the voice processing application may recite audio prompts of the voice processing application. In another example, the voice processing application may be scaled down for wireless user communications devices. In another example, the voice processing application may not provide a GUI and may listen to and dictate audio to a user such as voice assistant device 924, which in some instances, may not comprise a display.

In system 800, there is typically more than one of each type of user equipment device but only one of each is shown in FIG. 9 to avoid overcomplicating the drawing. In addition, each user may utilize more than one type of user equipment device (e.g., a user may have a television set and a computer) and also more than one of each type of user equipment device (e.g., a user may have a digital voice assistant device and a mobile telephone and/or multiple IOT devices).

In system 800, there is typically more than one of each type of user equipment device but only one of each is shown in FIG. 9 to avoid overcomplicating the drawing. In addition, each user may utilize more than one type of user equipment device (e.g., a user may have a television set and a computer) and also more than one of each type of user equipment device (e.g., a user may have a digital voice assistant device and a mobile telephone and/or multiple IOT devices).

The user equipment devices may be coupled to communications network 914. Namely, user television equipment 902, user computer equipment 904, and wireless user communications device 906 are coupled to communications network 914 via communications paths 908, 910, and 912, respectively. Communications network 914 may be one or more networks including the Internet, a mobile phone network, mobile device (e.g., iPhone) network, cable network, public switched telephone network, or other types of communications network or combinations of communications networks. Paths 908, 910, and 912 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 912 is drawn with dotted lines to indicate that in the exemplary embodiment shown in FIG. 9 it is a wireless path and paths 908 and 910 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 908, 910, and 912, as well other short-range point-to-point communication paths, wireless paths (e.g., Bluetooth, infrared, IEEE 902-11x, etc.), or other short-range communication via wired or wireless paths. BLUETOOTH is a certification mark owned by Bluetooth SIG, INC. The user equipment devices may also communicate with each other directly through an indirect path via communications network 914.

System 900 includes content metadata database (e.g., table structure of FIG. 3) 916, content data source (e.g., "Frozen" of FIG. 1 or FIG. 2) 918, and personalized content processing server 926 coupled to communications network 914 via communication paths 920, 922, and 928, respectively. Paths 920, 922, 928 may include any of the communication paths described above in connection with paths 908, 910, and 912. Communications with the content metadata database (database) 916 and content data source (source) 918 may be exchanged over one or more communications paths, but are shown as a single path in FIG. 9 to avoid overcomplicating the drawing. In addition, there may be more than one of each of database 916 and source 918, but only one of each is shown in FIG. 9 to avoid overcomplicating the drawing. If desired, content metadata database 916 and source 918 may be integrated as one device. Although communications between the database 916 and the source 918 with user equipment devices 902, 904, 906, 924, and 928 are shown as through communications network 914, in some embodiments, the database 916 and the source 918 may communicate directly with user equipment devices 902, 904, 906, 924, and 928 via communication paths (not shown) such as those described above in connection with paths 908, 910, and 912.

Database 916 may store or index a plurality of metadata (e.g., content identifier, entity type, relevance score) of the content used for ranking the content items based on voice query by the personalized content application. Database 916 may store or index a plurality of metadata (e.g., content identifier, entity type, relevance score) of the content items used for tailoring the relevance scores of the content items based on voice query by the personalized content application. In some embodiments, database 916 may index the location of the metadata located on servers located remotely or local to database 916. In some embodiments, in response to a determination of content item and entity type, the PMCA may access the index stored on database 916 and may identify a server (e.g., a database stored on a server) comprising the information to rank the content identifier corresponding to the content item. For example, the PMCA may receive a voice query from a child requesting a content item and rank the content identifier of child entity type higher than the content identifier of adult entity type. In another example, the PMCA may receive a voice query from adult requesting a content item and rank the content identifier of adult entity type higher than the content identifier of child entity type. In other embodiments, in response to a determination of content item and entity type, the PMCA may access the index stored on database 916 and may identify a server (e.g., a database stored on a server) comprising the information to tailor the relevance score corresponding to the content item and the identity type. For example, the PMCA may receive a voice query from a child requesting a content item. In response to receiving the query, the PMCA may search database 916 for the metadata corresponding to the content item and decrease the relevant score corresponding to content identifier of the adult entity type by a first value. In another example, the PMCA may receive a voice query from an adult requesting a content item. In response to receiving the query, the PMCA may search database 916 for the metadata corresponding to the content item and decrease the relevant score corresponding to the content identifier of the child entity type by a second value which is lower than the first value.

Source 918 may provide data used during the operation or function of the personalized content application. For example, source may store content items and functions associated with the personalized content application, etc. In some embodiments, updates for the PMCA may be downloaded via source 918.

The PMCA may be, for example, a stand-alone application implemented on user equipment devices. In other embodiments, PMCA may be a client-server application where only the client resides on the user equipment device. For example, the PMCA may be implemented partially as a client application on control circuitry 904 of devices 902, 904, 906, 924, and/or 928 and partially on a remote server as a server application (e.g., source 918, database 916, or server 926). The guidance application displays and/or voice control application displays may be generated by the source 918, database 916, personalized content processing server 926 and transmitted to the user equipment devices. The source 918, database 916, and PMCA server 926 may also transmit data for storage on the user equipment, which then generates the voice control application displays and audio based on instructions processed by control circuitry.

System 900 is intended to illustrate a number of approaches, or configurations, by which user equipment devices and sources and servers may communicate with each other. The present invention may be applied in any one or a subset of these approaches, or in a system employing other approaches for delivering and providing a voice control application.

Figure 10:
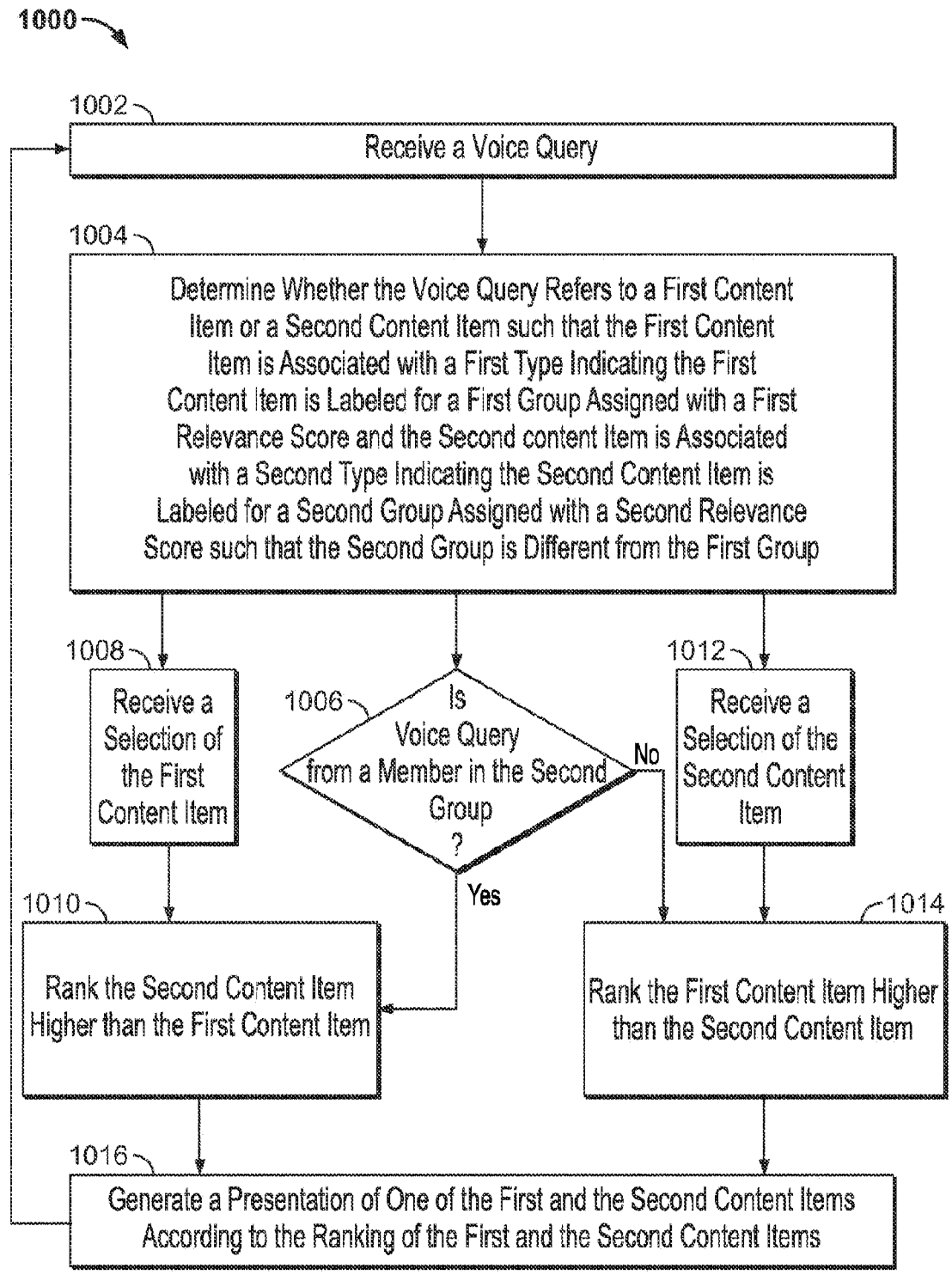
FIG. 10 depicts a flowchart of a illustrative example of a flow chart ranking content items by leveraging acoustic features of a user from a group to present a personalized content item in accordance with some embodiments of the disclosure

FIG. 10 is a flowchart of an illustrative process 1000 for ranking of content item by leveraging acoustic features of a user to present the personalized content item to the user, in accordance with some embodiments of the disclosure. In some embodiments, each step of the process 1000 can be performed by server 802 (e.g., via control circuitry 806) or by remote user equipment device 818 (e.g., via control circuitry 830) in FIG. 8. For the purpose of the process 1000, control circuitry 806 of the server 802 will be used for the steps below.

Process 1000 begins at block 1002, where the control circuitry receives a voice query. At block 1004, control circuitry determines whether the voice query refers to a first content item or a second content item such that the first content item is associated with a first type indicating that the first content item is labeled for a first group assigned with a first relevance score and the second content item is associated with a second type indicating that the second content item is labeled for a second group assigned with a second relevance score such that the second group is different from the first group. Each of the first and the second content items is labeled depending on the appropriateness and/or affinity a group of users may have for the content. For example, the first group may be adult entity type for adults as members of the first group and the second group may be child entity type for children as members of the second group. Other entity types may include labels for a generational age group, such as Gen Z, Gen X or Millennial, dialect, region, or other group information identifiable by audio signatures. Although any classification for any desired group of users could be generated using existing spectral characteristics and features of audio data.

In some embodiments, control circuitry may send the voice query to a remote service, (e.g., AI service), which returns the text of the query via a network (e.g., 814 in FIG. 8). Control circuitry may use any known speech to text processing algorithm.

At block 1006, the control circuitry determines whether the voice query is from a member of the second group. At block 1008, the control circuitry receives a selection of a first content item. If at block 1006, the voice query is determined to be from a member of the second group, process 1000 proceeds to block 1010, where the control circuitry ranks the second content item higher than the first content item. At block 1012, the control circuitry receives a selection of a second content item. If at block 1006, the voice query is determined to be not from a member of the second group, process 1000 proceeds to block 1014, where the control circuitry ranks the first content item higher than the second content item. Then, at block 1016, the control circuitry generates a presentation of one of the first and the second content items according to the ranking of the first and the second content items. In some embodiments, the control circuitry generates a presentation of the second content item ranked higher than the first content item when the selection is of a first content item and the voice query is from a member of the second group. In other embodiments, control circuitry generates a presentation of the first content item ranked higher than the second content item when the selection is of a second content item and the voice based query is not from a member of the second group. The process 1000 is repeated for each voice query received from the user.

Figure 11:
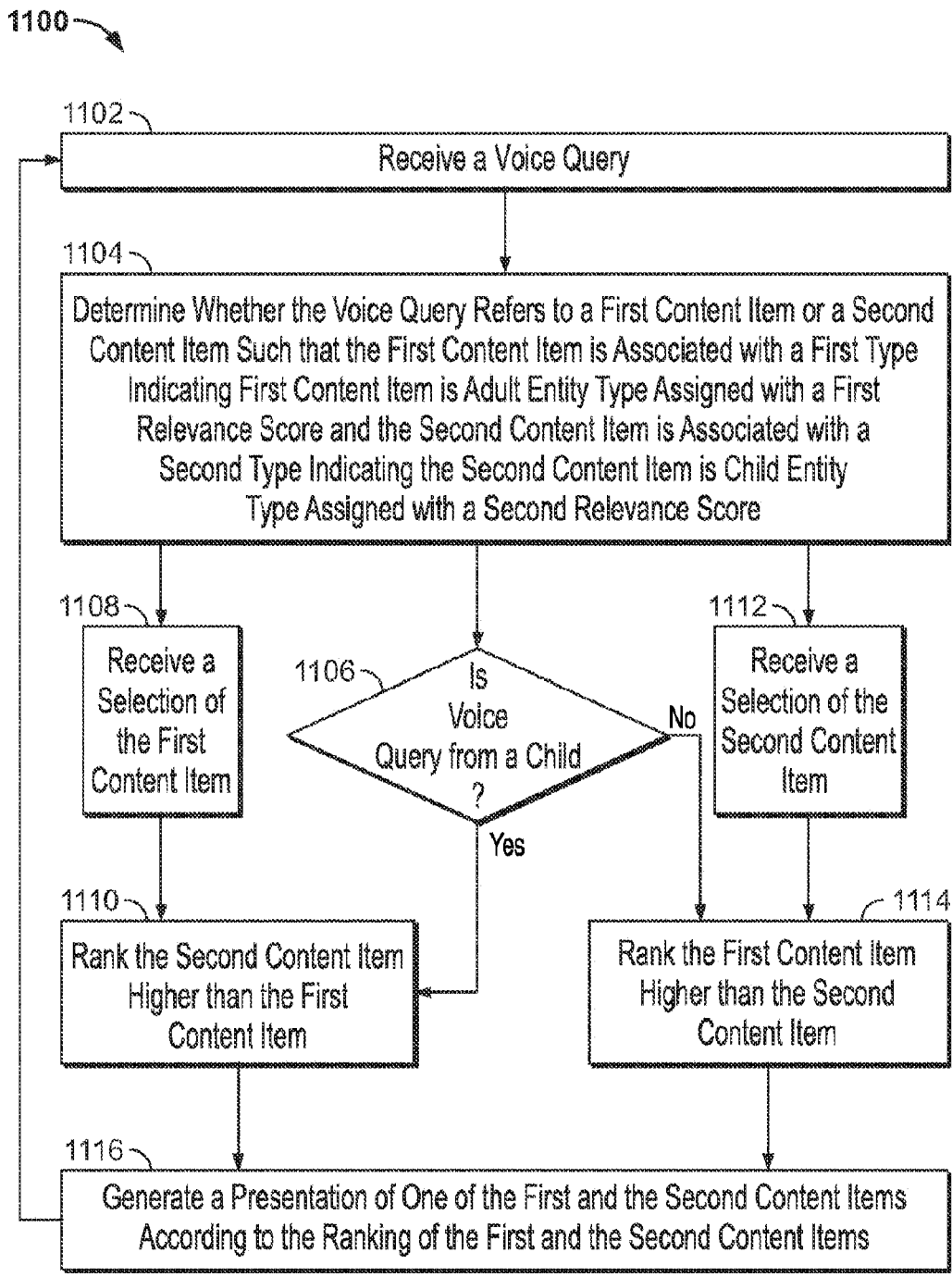
FIG. 11 depicts a flowchart of a illustrative example of a flow chart ranking content items by leveraging acoustic features of a user as a child or adult to present a personalized content item in accordance with some embodiments of the disclosure.

FIG. 11 is a flowchart of an illustrative process 1100 for ranking of content item by leveraging acoustic features of a user to present the personalized content item to the user, in accordance with some embodiments of the disclosure. In some embodiments, each step of the process 1100 can be performed by server 802 (e.g., via control circuitry 806) or by remote user equipment device 818 (e.g., via control circuitry 830) in FIG. 8. For the purpose of the process 1100, control circuitry 806 of the server 802 will be used for the steps below.

Process 1100 begins at block 1102, where the control circuitry receives a voice query. At block 1104, control circuitry determines whether the voice query refers to a first content item or a second content item such that the first content item is associated with a first type indicating that the first content item is adult entity type assigned with a first relevance score and the second content item is associated with a second type indicating that the second content item is child entity type assigned with a second relevance score. In some embodiments, control circuitry may send the voice query to a remote service, (e.g., AI service), which returns the text of the query via a network (e.g., 814 in FIG. 8). Control circuitry may use any known speech to text processing algorithm.

At block 1106, the control circuitry determines whether the voice query is from a child. At block 1108, the control circuitry receives a selection of a first content item. If at block 1106, the voice query is determined to be from a child, process 1100 proceeds to block 1110, where the control circuitry ranks the second content item higher than the first content item. At block 1112, the control circuitry receives a selection of a second content item. If at block 1106, the voice query is determined to be not from the child, process 1100 proceeds to block 1114, where the control circuitry ranks the first content item higher than the second content item. Then, at block 1116, the control circuitry generates a presentation of one of the first and the second content items according to the ranking of the first and the second content items. In some embodiments, the control circuitry generates a presentation of the second content item ranked higher than the first content item when the selection is of a first content item and the voice query is from a child. In other embodiments, control circuitry generates a presentation of the first content item ranked higher than the second content item when the selection is of a second content item and the voice based query is not from a child. The process 1100 is repeated for each voice query received from the user.

Figure 12:
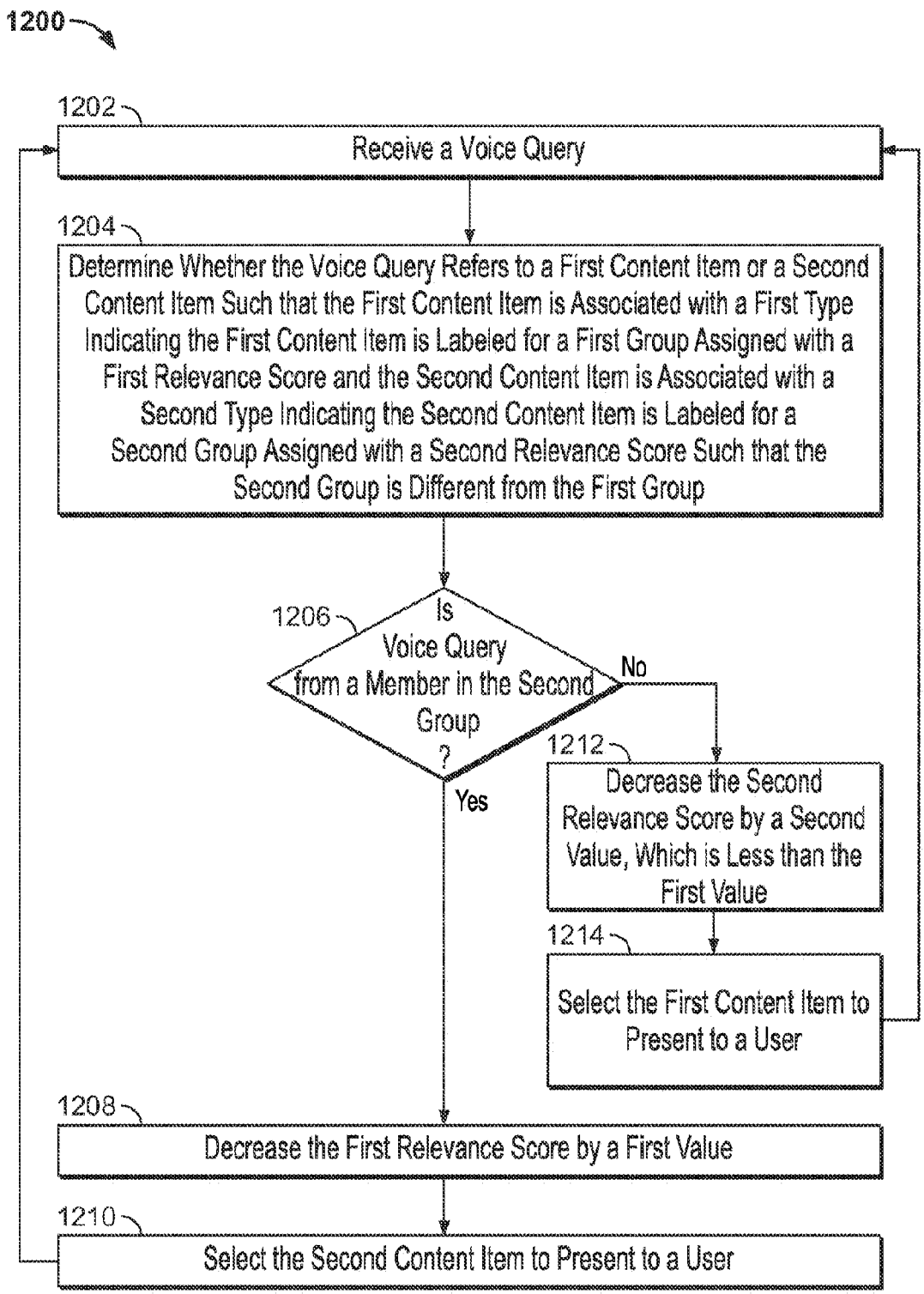
FIG. 12 depicts a flowchart of an illustrative example of tailoring relevancy of content item by leveraging acoustic features of a user from a group to present a personalized content item in accordance with some embodiments of the disclosure.

FIG. 12 is a flowchart of an illustrative process 1200 for tailoring relevancy of content by leveraging acoustic features of a user to present the personalized content item to the user, in accordance with some embodiments of the disclosure. In some embodiments, each step of the process 1200 can be performed by server 802 (e.g., via control circuitry 806) or by remote user equipment device 818 (e.g., via control circuitry 830) in FIG. 8. For the purpose of the process 1200, control circuitry 806 of the server 802 will be used for the steps below.

Process 1200 begins at block 1202, where the control circuitry receives a voice query. At block 1204, the control circuitry determines whether the voice query refers to a first content item or a second content item such that the first content item is associated with a first type indicating the first content item is labeled for a first group assigned with a first relevance score and the second content item is associated with a second type indicating the second content item is labeled for a second group assigned with a second relevance score such that the second group is different from the first group. Each of the first and the second content items is labeled depending on the appropriateness and/or affinity a group of users may have for the content. For example, the first group may be adult entity type for adults as members of the first group and the second group may be child entity type for children as members of the second group. Other entity types may include labels for a generational age group, such as Gen Z, Gen X or Millennial, dialect, region, or other group information identifiable by audio signatures. Although any classification for any desired group of users could be generated using existing spectral analysis of audio data.

In some embodiments, the control circuitry may send the voice query to a remote, (e.g., AI service), which returns the text of the query via a network (e.g., 814 in FIG. 8). Control circuitry may use any known speech to text processing algorithm.

At block 1206, the control circuitry determines whether the voice query is from a member in the second group. If at block 1206, the voice query is determined to be from a member in the second group, process 1200 proceeds to block 1208, where the control circuitry adjusts the first relevance score. Then, at block 1210, the control circuitry selects the second content item to present to the user. However, if at block 1206, the voice query is determined to be not from a member of the second group, process 1200 proceeds to block 1212, where the control circuity adjusts the second relevance score. Then, at block 1214, the control circuitry selects the first content item to present to the user. At block 1116, the control circuitry selects the second content item to present to the user. The process 1100 is repeated for each voice query received from the user.

Figure 13:
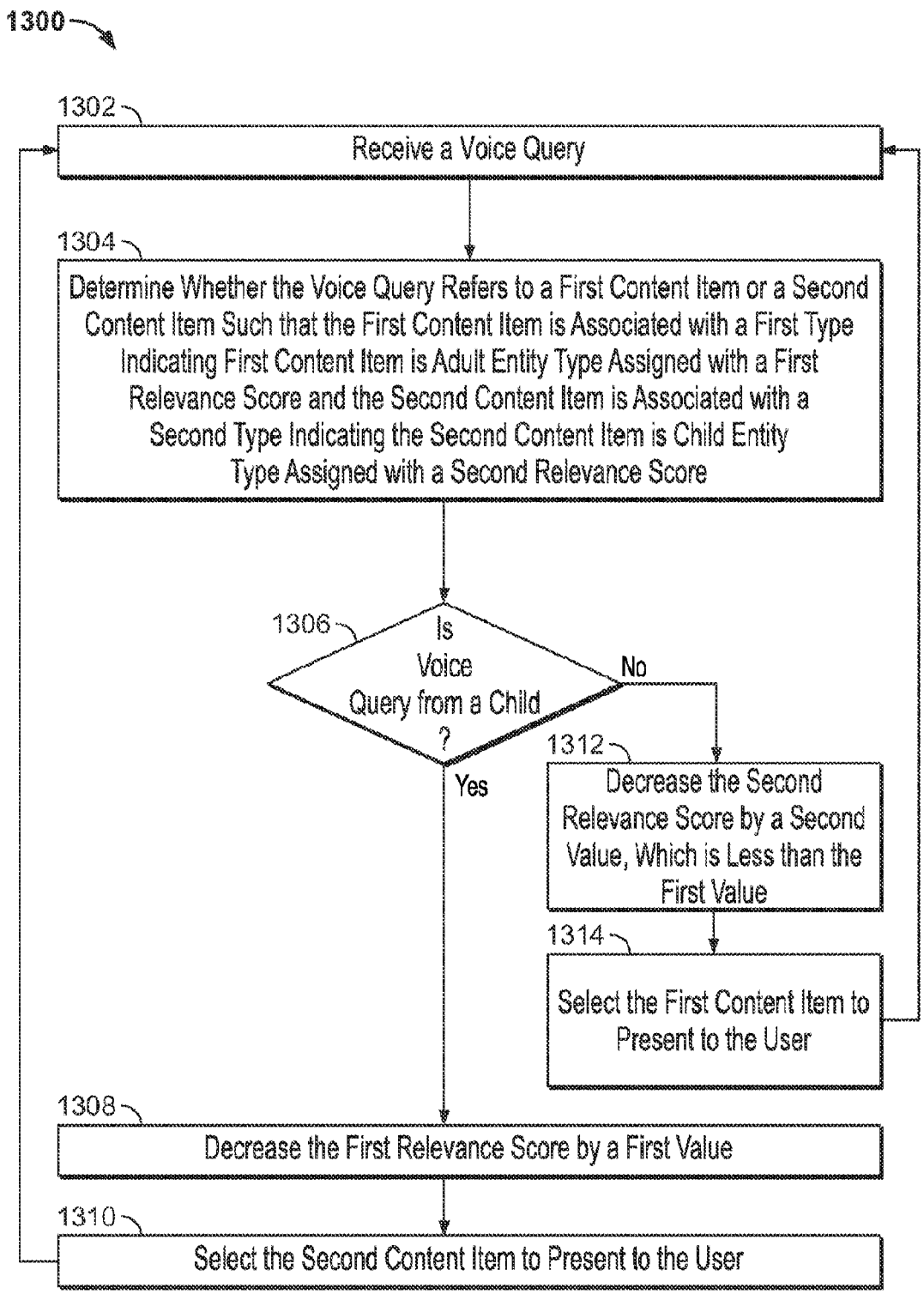
FIG. 13 depicts a flowchart of an illustrative example of tailoring relevancy of content item by leveraging acoustic features of a user as a child or an adult to present a personalized content item in accordance with some embodiments of the disclosure.

FIG. 13 is a flowchart of an illustrative process 1300 for tailoring relevancy of content by leveraging acoustic features of a user to present the personalized content item to the user, in accordance with some embodiments of the disclosure. In some embodiments, each step of the process 1300 can be performed by server 1302 (e.g., via control circuitry 1306) or by remote user equipment device 1318 (e.g., via control circuitry 1330) in FIG. 13. For the purpose of the process 1300, control circuitry 1306 of the server 1302 will be used for the steps below.

Process 1300 begins at block 1302, where the control circuitry receives a voice query. At block 1304, the control circuitry determines whether the voice query refers to a first content or a second content such that the first content has first type indicating it is adult-friendly with a first relevance score is assigned to the first content and the second content has a second type indicating it is child-friendly with a second relevance score is assigned to the second content. In some embodiments, the control circuitry may send the voice query to a remote, (e.g., AI service), which returns the text of the query via a network (e.g., 814 in FIG. 8). Control circuitry may use any known speech to text processing algorithm.

At block 1306, the control circuitry determines whether the voice query is from a child. If at block 1306, the voice query is determined to be from a child, process 1300 proceeds to block 1308, where the control circuitry adjusts the first relevance score. Then, at block 1310, the control circuitry selects the second content to present to the user. However, if at block 1306, the voice query is determined to be not from a child, process 1300 proceeds to block 1312, where the control circuity adjusts the second relevance score. Then, at block 1314, the control circuitry selects the first content to present to the user. At block 1316, the control circuitry selects the second content to present to the user. The process 1300 is repeated for each voice query received from the user.

Figure 14:
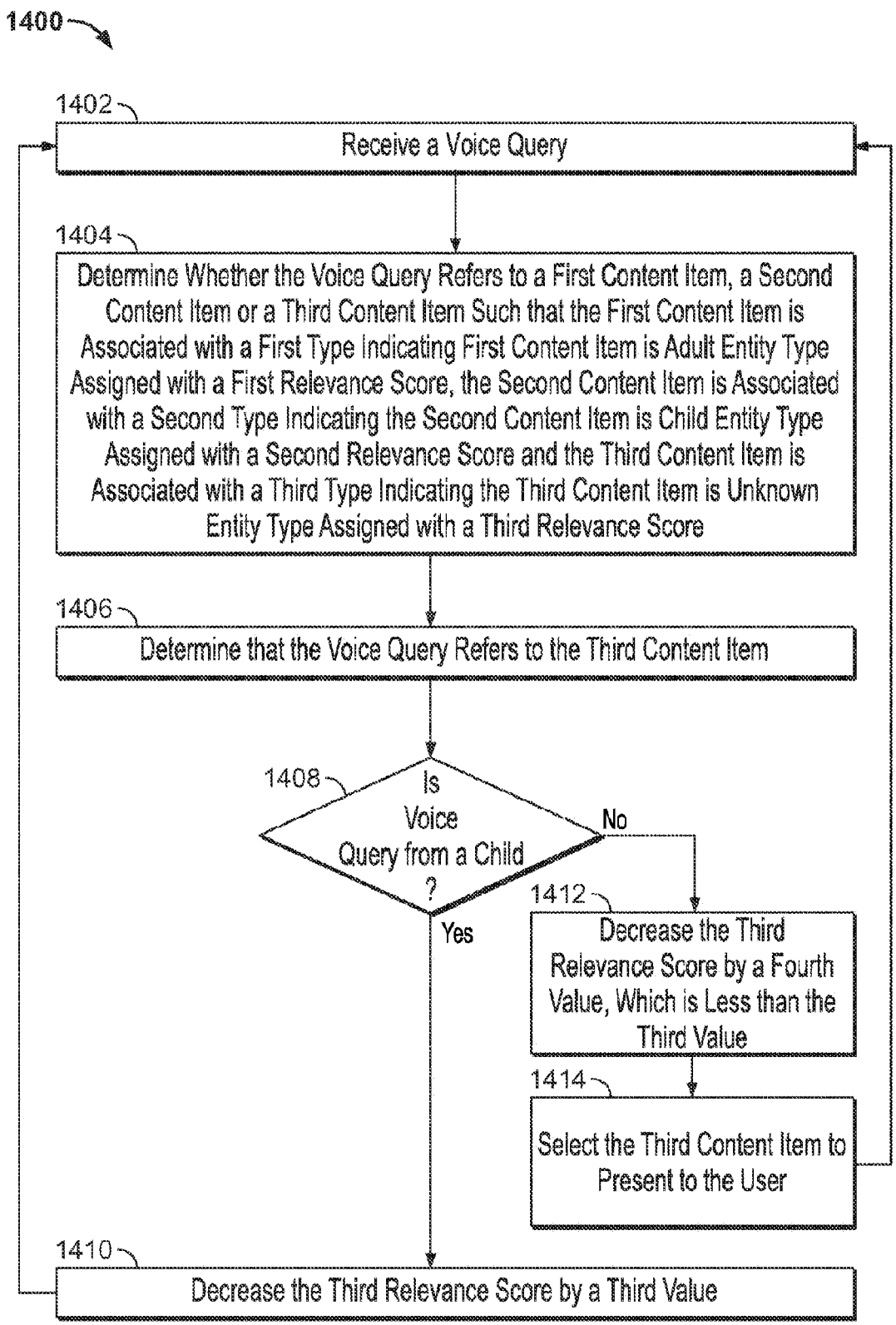
FIG. 14 depicts a flowchart of an illustrative example of tailoring relevancy of content item by leveraging acoustic features of a user to present a personalized content item in accordance with other embodiments of the disclosure.

FIG. 14 is a flowchart of an illustrative process 1400 for tailoring relevancy of content by leveraging acoustic features of a user to present personalized content item to the user, in accordance with some embodiments of the disclosure. In some embodiments, each step of the process 1400 can be performed by server 802 (e.g., via control circuitry 806) or by remote user equipment device 818 (e.g., via control circuitry 830) in FIG. 8. For the purpose of the process 1400, control circuitry 806 of the server 802 will be used for the steps below.

Process 1400 begins at block 1402, where the control circuitry receives a voice query. At block 1404, the control circuitry determines whether the voice query refers to a first content item, a second content item or a third content item such that the first content item is associated with a first type indicating the first content item is adult entity type assigned with a first relevance score, the second content item is associated with a second type indicating the second content item is child entity type assigned with a second relevance score and the third content item is associated with a third type indicating the third content item is unknown entity type assigned with a third relevance score.

At block 1406, the control circuitry determines that the query refers to the third content item. At block 1408, the control circuitry determines whether the voice query is from a child. If at block 1408, if it is determined that the voice query is from a child, then at block 1410, the third relevance score is reduced by a third value. If at block 1408, it is determined that the voice query is not from a child, then at block 1412, the third relevance score is reduced by a fourth value, which is less than the third value. At block, 1414, the third content is selected to present to the user. The process 1400 is repeated for each voice query received from the user.

Figure 15:
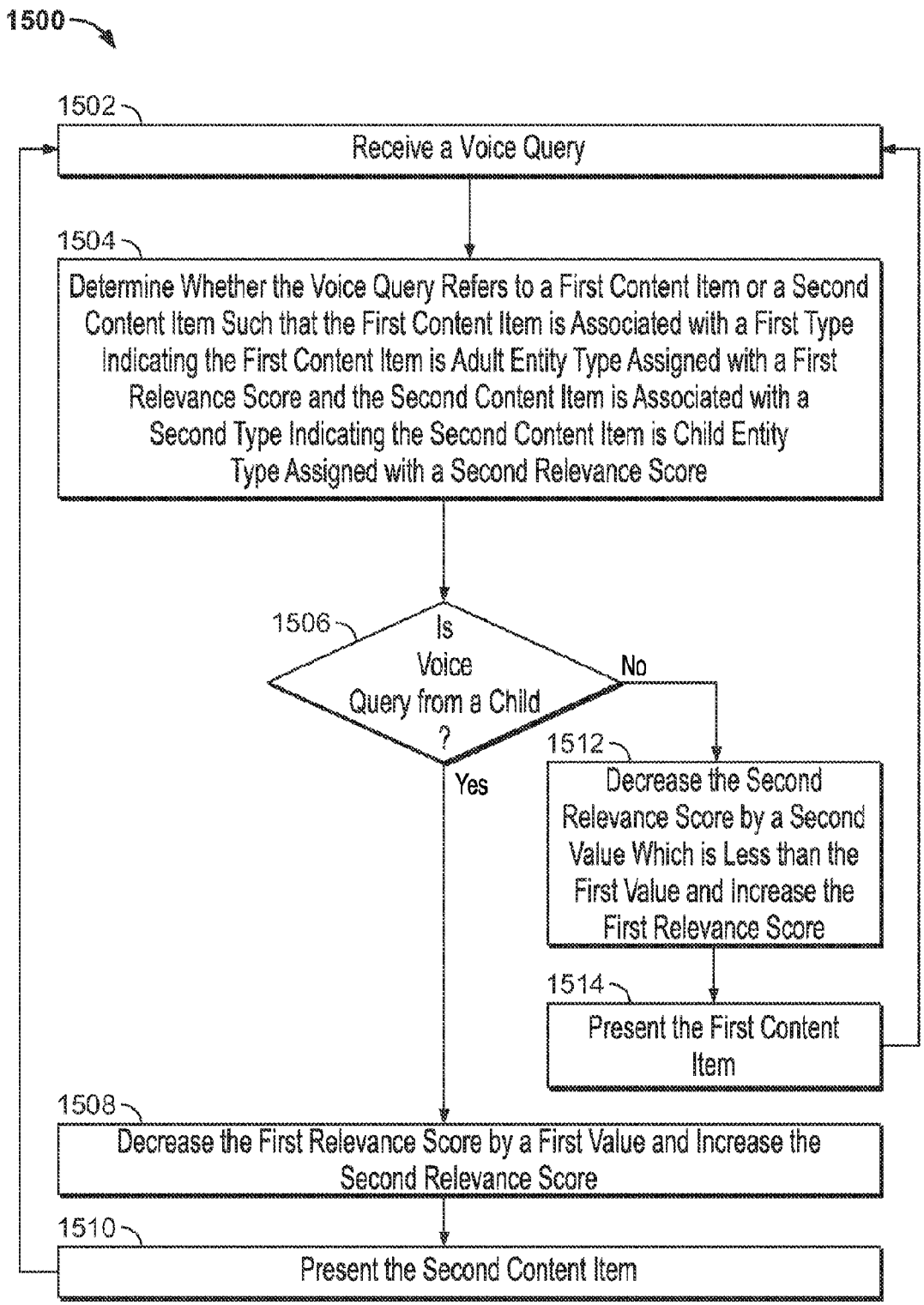
FIG. 15 depicts a flowchart of an illustrative example of tailoring relevancy of content item by leveraging acoustic features of a user to present a personalized content item in accordance with other embodiments of the disclosure.

FIG. 15 is a flowchart of an illustrative process 1500 for tailoring relevancy of content by leveraging acoustic features of a user to present personalized content item to the user, in accordance with some embodiments of the disclosure. In some embodiments, each step of process 1500 can be performed by server 802 (e.g., via control circuitry 806) or by remote user equipment device 818 (e.g., via control circuitry 830) in FIG. 8. For the purpose of the process 1500, control circuitry 806 of the server 802 will be used for the steps below.

At block 1502, the control circuitry receives a voice query. At block, 1504, the control circuitry determines whether the voice query refers to a first content item or a second content item such that the first content item is associated with a first type indicating the first content item is adult entity type assigned with a first relevance score and the second content item is associated with a second type indicating the second content item is child entity type assigned with a second relevance score.

At block 1506, the control circuitry determines where the user is a child based on the voice query. If at block 1506, it is determined that the user is a child, the control circuitry at block 1508, the control circuitry decreases the first relevance score by a first value and increases the second relevance score. At block 1510, the control circuitry presents the second content item. If at block 1510, it is determined that the user is not a child, then at block 1512, the control circuitry decreases the second relevance score by a second value, which is less than the first value. At block 1514, the control circuitry presents the second content item. The process 1500 is repeated for each voice query received from the user.

It is contemplated that the steps or descriptions of FIGS. 10-15 may be used with any other embodiment of this disclosure. In addition, the descriptions described in relation to the algorithms of FIGS. 10-15 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes as described in FIGS. 10-15 may be implemented on a combination of appropriately configured software and hardware, and that any of the devices or equipment discussed in relation to FIGS. 1, 2, 4, 8 and 9 could be used to implement one or more portions of the process.

The above-described embodiments of the present disclosure are presented for purposes of illustration and not of limitation, and the present disclosure is limited only by the claims that follow. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

This specification discloses embodiments which include, but are not limited to, the following:

1. A method comprising:
  receiving, by a control circuitry, a voice query;
  identifying, by the control circuitry, a plurality of content items stored in a database that match the voice query, wherein the plurality of content items comprises:
    a first content item having an associated first type and a first score, wherein the first type indicates the first content item is labeled for a first group, and the first score indicates a level of affinity of the first content item for members of the first group; and
    a second content item having an associated second type and a second score, wherein the second type indicates the second content item is labeled for a second group different from the first group, and the second score indicates a level of affinity of the second content item for members of the second group;
  receiving, by the control circuitry, a selection of one of the first content item or the second content item;
  determining whether the voice query is from a member of the second group;
  in response to determining the voice query is not from a member of the second group and the selection is of the second content item, ranking, by the control circuitry, the first content item higher than the second content item for presentation;
  in response to determining the voice query is from a member of the second group and the selection is of the first content item ranking, by the control circuitry, the second content item higher than the first content item for the presentation; and
  generating, by the control circuitry, a presentation of one of the first content item or the second content item according to the ranking of the first and second content items.

2. The method of item 1 further comprising:
  in response to ranking the second content item higher than the first content item outputting the presentation of the second content item.

3. The method of item 1 further comprising:
  in response to ranking the first content item higher than the second content item outputting the presentation of the first content item.

4. The method of item 1 further comprising:
  displaying the first content item and the second content item in response to determining that the voice query is not from the member of the second group.

5. The method of item 1 wherein each of the plurality of content items is assigned with a content identifier identifying the corresponding content item.

6. The method of item 5 wherein generating the presentation further comprising displaying each of the plurality of content identifiers according to the ranking of the content items.

7. The method of item 1 wherein the first content item is labeled for the first group based on genre and rating of the first content item.

8. The method of item 1 wherein the second content item is labeled for the second group based on genre and rating of the second content item.

9. The method of item 1 further comprising determining that the voice query refers to a third content item, wherein the third content item having an associated third type and a third score, wherein the third type indicates the third content item is labeled for a third group and the third score indicates a level of affinity of the third content item for members of the third group, wherein the members of the third group are one of a part of the members of the first and the second groups or not part of the members in the first group or the second group.

10. The method of item 9 wherein the third content item is labeled for the third group based on genre and rating of the third content item.

11. A system comprising:
  a memory configured to store a plurality of content items, wherein the plurality of content items comprises:
    a first content item having an associated first type and a first score, wherein the first type indicates the first content item is labeled for first group, and the first score indicates a level of affinity of the first content item for members of the first group; and
    a second content item having an associated second type and a second score, wherein the second type indicates the second content item is labeled for a second group different from the first group, and the second score indicates a level of affinity of the second content item for members of the second group; and
  a control circuitry coupled to the memory and configured to:
    receiving a voice query;
    identify the plurality of content items that match the voice query,
    receive, a selection of one of the first content item or the second content item;
    determine whether the voice query is from a member of the second group;
    in response to determining the voice query is not from a member of the second group and the selection is of the second content item, rank, the first content item higher than the second content item for presentation;
    in response to determining the voice query is from a member of the second group and the selection is of the first content item, rank the second content item higher than the first content item for the presentation; and
    generate a presentation of one of the first content item or the second content item according to the ranking of the first and second content items.

12. The system of item 11 wherein the control circuitry is configured to output the presentation of the second content item in response to ranking the second content item higher than the first content item.

13. The system of item 11 wherein the control circuitry is configured to output the presentation of the first content item in response to ranking the first content item higher than the second content.

14. The system of item 11 wherein the control circuitry is configured to display the first content item and the second content item in response to determining that the voice query is not from the member of the second group.

15. The system of item 11 wherein each of the plurality of content items is assigned with a content identifier identifying the corresponding content item.

16. The system of item 15 wherein to generate the presentation, the control circuitry is configured to display each of the plurality of content identifiers according to the ranking of the content items.

17. The system of item 11 wherein the first content item is labeled for the first group based on genre and rating of the first content item.

18. The system of item 11 wherein the second content item is labeled for the second group based on genre and rating of the second content item.

19. The system of item 11 wherein the control circuitry is configured to determine that the voice query refers to a third content item, wherein the third content item having an associated third type and a third score, wherein the third type indicates the third content item is labeled for a third group and the third score indicates a level of affinity of the third content item for members of the third group, wherein the members of the third group are one of a part of the members of the first and the second groups or not part of the members in the first group or the second group.

20. The system of item 19 wherein the third content item is labeled for the third group based on genre and rating of the third content item.

21. A system for providing enhanced personalization in a domain, the system comprising:
    means for receiving a voice query;
    means for identifying a plurality of content items that match the voice query, wherein the plurality of content items comprises:
        a first content item having an associated first type and a first score, wherein the first type indicates the first content item is labeled for first group, and the first score indicates a level of affinity of the first content item for members of the first group; and
        a second content item having an associated second type and a second score, wherein the second type indicates the second content item is labeled for a second group different from the first group, and the second score indicates a level of affinity of the second content item for members of the second group; and
    means for receiving, a selection of one of the first content item or the second content item;
    means for determining whether the voice query is from a member of the second group;
    means for ranking the first content item higher than the second content item for presentation in response to determining the voice query is not from a member of the second group and the selection is of the second content item;
    means for ranking the second content item higher than the first content item for the presentation in response to determining the voice query is from a member of the second group and the selection is of the first content item; and
    generating a presentation of one of the first content item or the second content item according to the ranking of the first and second content items.

22. The system of item 21 further comprising:
    means for outputting the presentation of the second content item in response to ranking the second content item higher than the first content item 23. The system of item 21 further comprising:
    means for outputting the presentation of the first content item in response to ranking the first content item higher than the second content item.

24. The system of item 21 further comprising:
    means for displaying the first content item and the second content item in response to determining that the voice query is not from the member of the second group.

25. The system of item 21 wherein each of the plurality of content items is assigned with a content identifier identifying the corresponding content item.

26. The system of item 25 wherein means for generating the presentation comprises means for displaying each of the plurality of content identifiers according to the ranking of the content items.

27. The system of item 21 wherein the first content item is labeled for first group based on genre and rating of the first content item.

28. The system of item 21 wherein the second content item is labeled for the second group based on genre and rating of the second content item.

29. The system of item 21 further comprising means for determining that the voice query refers to a third content item, wherein the third content item having an associated third type and a third score, wherein the third type indicates the third content item is labeled for a third group and the third score indicates a level of affinity of the third content item for members of the third group, wherein the members of the third group are one of a part of the members of the first and the second groups or not part of the members in the first group or the second group.

30. The system of item 29 wherein the third content item is labeled for the third group based on genre and rating of the third content item.

31. A non-transitory computer readable medium having instructions encoded thereon that when executed by control circuitry causes the control circuitry to:
    receive a voice query;
    identify a plurality of content items that match the voice query, wherein the plurality of content items comprises:
        a first content item having an associated first type and a first score, wherein the first type indicates the first content item is labeled for a first group, and the first score indicates a level of affinity of the first content item for members of the first group; and
        a second content item having an associated second type and a second score, wherein the second type indicates the second content item is labeled for a second group, and the second score indicates a level of affinity of the second content item for members of the second group;
    receive a selection of one of the first content item or the second content item;
    determine whether the voice query is from a member of the second group;

in response to determining the voice query is not from a member of the second group and the selection is of the second content item, rank the first content item higher than the second content item for presentation;

in response to determining the voice query is from a member of the second group and the selection is of the first content item, rank the second content item higher than the first content item for the presentation; and generate a presentation of one of the first content item or the second content item according to the ranking of the first and second content items.

32. The non-transitory computer readable medium of item 31 further having instructions encoded thereon that when executed by control circuitry causes the control circuitry to:

output the presentation of the second content item in response to ranking the second content item higher than the first content item.

33. The non-transitory computer readable medium of item 31 further having instructions encoded thereon that when executed by control circuitry causes the control circuitry to:

output the presentation of the first content item in response to ranking the first content item higher than the second content item.

34. The non-transitory computer readable medium of item 31 further having instructions encoded thereon that when executed by control circuitry causes the control circuitry to:

display the first content item and the second content item in response to determining that the voice query is not from the member of the second group.

35. The non-transitory computer readable medium of item 31 wherein each of the plurality of content items is assigned with a content identifier identifying the corresponding content item.

36. The non-transitory computer readable medium of item 35 further having instructions encoded thereon that when executed by control circuitry causes the control circuitry to:

display each of the plurality of content identifiers according to the ranking of the content items.

37. The non-transitory computer readable medium of item 31 wherein the first content item is labeled for the first group based on genre and rating of the first content item.

38. The non-transitory computer readable medium of item 31 wherein the second content item is labeled for the second group based on genre and rating of the second content item.

39. The non-transitory computer readable medium of item 31 further having instructions encoded thereon that when executed by control circuitry causes the control circuitry to:

determine that the voice query refers to a third content item, wherein the third content item having an associated third type and a third score, wherein the third type indicates the third content item is labeled for a third group and the third score indicates a level of affinity of the third content item for members of the third group, wherein the members of the third group are one of a part of the members of the first and the second groups or not part of the members in the first group or the second group.

40. The non-transitory computer readable medium of item 39 wherein the third content item is labeled for the third group based on genre and rating of the third content item.

41. A method comprising:

identifying, by a control circuitry, a plurality of content items stored in a database that match a voice query, wherein the plurality of content items comprises:

a first content item having an associated first type and a first score, wherein the first type indicates the first content item is labeled for a first group, and the first score indicates a level of affinity of the first content item for members of the first group; and a second content item having an associated second type and a second score, wherein the second type indicates the second content item is labeled for a second group different from the first group, and the second score indicates a level of affinity of the second content item for members of the second group;

presenting, by the control circuitry, a selection of one of the first content item or the second content item;

determining whether the voice query is from a member of the second group;

in response to determining the voice query is not from a member of the second group and the selection is of the second content item, ranking, by the control circuitry, the first content item higher than the second content item for presentation;

in response to determining the voice query is from a member of the second group and the selection is of the first content item ranking, by the control circuitry, the second content item higher than the first content item for the presentation; and generating, by the control circuitry, a presentation of one of the first content item or the second content item according to the ranking of the first and second content items.

42. The method of item 41 further comprising:

in response to ranking the second content item higher than the first content item outputting the presentation of the second content item.

43. The method of item 41 further comprising:

in response to ranking the first content item higher than the second content item outputting the presentation of the first content item.

44. The method of item 41 further comprising:

displaying the first content item and the second content item in response to determining that the voice query is not from the member of the second group.

45. The method of item 41 wherein each of the plurality of content items is assigned with a content identifier identifying the corresponding content item.

46. The method of item 45 wherein generating the presentation further comprising displaying each of the plurality of content identifiers according to the ranking of the content items.

47. The method of item 41 wherein the first content item is labeled for the first group based on genre and rating of the first content item.

48. The method of item 41 wherein the second content item is labeled for the second group based on genre and rating of the second content item.

49. The method of item 41 further comprising determining that the voice query refers to a third content item, wherein the third content item having an associated third type and a third score, wherein the third type indicates the third content item is labeled for a third group and the third score indicates a level of affinity of the third content item for members of the third group, wherein the members of the third group are one of a part of the members of the first and the second groups or not part of the members in the first group or the second group.

50. The method of item 49 wherein the third content item is labeled for the third group based on genre and rating of the third content item.

What is claimed is:

1. A method comprising:
    receiving a voice query;
    identifying, by control circuitry, a plurality of content items based on the voice query, wherein the plurality of content items comprises:
        a first content item having an associated first type and a first relevance score, wherein the first type indicates the first content item is labeled for a first group, and the first relevance score indicates a level of relevance of the first content item to members of the first group;
        a second content item having an associated second type and a second relevance score, wherein the second type indicates the second content item is labeled for a second group different from the first group, and the second relevance score indicates a level of relevance of the second content item to members of the second group;
    determining that the voice query is from a member of the first group or second group by classifying the voice query based on acoustic features of the voice query;
    based on the determining, modifying, by the control circuitry, one or both of the first relevance score of the first content item and the second relevance score of the second content item; and
    after modifying one or both of the first relevance score and the second relevance score, selecting, by the control circuitry, for a presentation the first content item or the second content item based on the first relevance score and the second relevance score.

2. The method of claim 1, wherein the modifying, by the control circuitry, the one or both of the first relevance score of the first content item and the second relevance score of the second content item comprises:
    based on the determining that the voice query is from a member of the first group, increasing, by a first value, the first relevance score.

3. The method of claim 2, wherein the modifying, by the control circuitry, the one or both of the first relevance score of the first content item and the second relevance score of the second content item comprises:
    based on the determining that the voice query is from a member of the first group, decreasing, by a second value, the second relevance score.

4. The method of claim 3, wherein:
    the first group is an adult entity and the second group a child entity; and
    the second value is more than the first value.

5. The method of claim 2, wherein the selecting for the presentation the first content item or second content item based on the first relevance score and second relevance score further comprises:
    based on the determining that the voice query is from a member of the first group, selecting for the presentation the first content item or second content item that is closer to a first range boundary, wherein:
        the first range boundary is set to a first score associated with content items corresponding to the first group; or
    based on the determining that the voice query is from a member of the second group, selecting for the presentation the first content item or second content item that is closer to a second range boundary, wherein:
        the second range boundary is set to a second score associated with content items corresponding to the second group.

6. The method of claim 5, wherein:
    the plurality of content items further comprises:
        a third content item having an associated third type and a third relevance score, wherein the third type indicates the third content item is labeled for a third group, and the third relevance score indicates a level of relevance of the third content item to members of the third group, the third group deemed to be different from the first group and second group; and
    the method further comprises:
        setting the third relevance score closer to the first score to bring the third content item closer to the first range boundary.

7. The method of claim 1, wherein:
    the determining that the voice query is from a member of the first group or second group by classifying the voice query based on the acoustic features of the voice query further comprises:
        determining, based on the acoustic features of the voice query, that the member of the first group is a member of a subgroup of the first group or the member of the second group is a member of a subgroup of the second group; and
    the selecting for the presentation the first content item or second content item based on the first and second relevance scores further comprises:
        based on the determining that the voice query is from a member of the subgroup of the first group, selecting for the presentation the first content item or second content item that is closer to a third range boundary, wherein:
            the third range boundary is set to a score associated with content items corresponding to the subgroup of the first group; or
        based on the determining that the voice query is from a member of the subgroup of the second group, selecting for the presentation one of the first content item or second content item, that is closer to a fourth range boundary, wherein:
            the fourth range boundary is set to a score associated with content items corresponding to the subgroup of the second group.

8. The method of claim 5, wherein:
    the first group comprises multiple subgroups; and
    the first score is an average of scores, each score being associated with content items corresponding to a respective subgroup of the first group.

9. The method of claim 1, further comprising:
    receiving a selection of the first content item;
    based on (i) determining that the voice query is from a member of the first group and (ii) the receiving the selection of the first content item, modifying the first relevance score of the first content item by a first amount; and based on (i) determining that the voice query is from a member of the second group and (ii) the receiving the selection of the first content item, modifying the first relevance score of the first content item by a second amount, wherein the first amount is greater than the second amount.

10. The method of claim 1, further comprising:
receiving a selection of the second content item;
based on (i) determining that the voice query is from the member of the first group and (ii) the receiving the selection of the second content item, modifying the second relevance score of the second content item by a first amount; and
based on (i) determining that the voice query is from the member of the second group and (ii) the receiving the selection of the second content item, modifying the second relevance score of the second content item by a second amount,
wherein the first amount is greater than the second amount.

11. A system comprising:
control circuitry configured to:
receive a voice query;
identify, by control circuitry, a plurality of content items based on the voice query, wherein the plurality of content items comprises:
a first content item having an associated first type and a first relevance score, wherein the first type indicates the first content item is labeled for a first group, and the first relevance score indicates a level of relevance of the first content item to members of the first group;
a second content item having an associated second type and a second relevance score, wherein the second type indicates the second content item is labeled for a second group different from the first group, and the second relevance score indicates a level of relevance of the second content item to members of the second group;
determine that the voice query is from a member of the first group or second group by classifying the voice query based on acoustic features of the voice query;
based on the determining, modify, by the control circuitry, one or both of the first relevance score of the first content item and the second relevance score of the second content item; and
after modifying one or both of the first relevance score and the second relevance score, select for a presentation the first content item or the second content item based on the first relevance score and the second relevance score.

12. The system of claim 11, wherein the control circuitry is further configured to modify the one or both of the first relevance score of the first content item and the second relevance score of the second content item by:
based on the determining that the voice query is from a member of the first group, increasing, by a first value, the first relevance score.

13. The system of claim 12, wherein the control circuitry is further configured to modify the one or both of the first relevance score of the first content item and the second relevance score of the second content item by:
based on the determining that the voice query is from a member of the first group, decreasing, by a second value, the second relevance score.

14. The system of claim 13, wherein:
the first group is an adult entity and the second group a child entity; and
the second value is more than the first value.

15. The system of claim 12, wherein the control circuitry is further configured to select for the presentation the first content item or second content item based on the first relevance score and second relevance score by:
based on the determining that the voice query is from a member of the first group, selecting for the presentation the first content item or second content item that is closer to a first range boundary, wherein:
the first range boundary is set to a first score associated with content items corresponding to the first group; or
based on the determining that the voice query is from a member of the second group, selecting for the presentation the first content item or second content item that is closer to a second range boundary, wherein:
the second range boundary is set to a second score associated with content items corresponding to the second group.

16. The system of claim 15, wherein:
the plurality of content items further comprises:
a third content item having an associated third type and a third relevance score, wherein the third type indicates the third content item is labeled for a third group, and the third relevance score indicates a level of relevance of the third content item to members of the third group, the third group deemed to be different from the first group and second group; and
the control circuitry is further configured to:
set the third relevance score closer to the first score to bring the third content item closer to the first range boundary.

17. The system of claim 11, wherein:
the control circuitry is further configured to determine that the voice query is from a member of the first group or second group by classifying the voice query based on the acoustic features of the voice query by:
determining, based on the acoustic features of the voice query, that the member of the first group is a member of a subgroup of the first group or the member of the second group is a member of a subgroup of the second group; and
the control circuitry is further configured to select for the presentation the first content item or second content item based on the first and second relevance scores by:
based on the determining that the voice query is from a member of the subgroup of the first group, selecting for the presentation the first content item or second content item that is closer to a third range boundary, wherein:
the third range boundary is set to a score associated with content items corresponding to the subgroup of the first group; or
based on the determining that the voice query is from a member of the subgroup of the second group, selecting for the presentation one of the first content item or second content item, that is closer to a fourth range boundary, wherein:
the fourth range boundary is set to a score associated with content items corresponding to the subgroup of the second group.

18. The system of claim 15, wherein:
the first group comprises multiple subgroups; and
the first score is an average of scores, each score being associated with content items corresponding to a respective subgroup of the first group.

19. The system of claim 11, wherein the control circuitry is further configured to:
receive a selection of the first content item;
based on (i) determining that the voice query is from a member of the first group and (ii) the receiving the selection of the first content item, modify the first relevance score of the first content item by a first amount; and
based on (i) determining that the voice query is from a member of the second group and (ii) the receiving the selection of the first content item, modify the first relevance score of the first content item by a second amount,
wherein the first amount is greater than the second amount.

20. The system of claim 11, wherein the control circuitry is further configured to:
receive a selection of the second content item;
based on (i) determining that the voice query is from the member of the first group and (ii) the receiving the selection of the second content item, modify the second relevance score of the second content item by a first amount; and
based on (i) determining that the voice query is from the member of the second group and (ii) the receiving the selection of the second content item, modify the second relevance score of the second content item by a second amount,
wherein the first amount is greater than the second amount.

* * * * *